United States Patent
Takagi

(10) Patent No.: US 9,365,354 B2
(45) Date of Patent: Jun. 14, 2016

(54) LINEAR CONVEYOR

(71) Applicant: YAMAHA HATSUDOKI KABUSHIKI KAISHA, Shizuoka-ken (JP)

(72) Inventor: Katsuyuki Takagi, Shizuoka-ken (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 290 days.

(21) Appl. No.: 14/353,465

(22) PCT Filed: Oct. 9, 2012

(86) PCT No.: PCT/JP2012/006461
§ 371 (c)(1),
(2) Date: Apr. 22, 2014

(87) PCT Pub. No.: WO2013/069203
PCT Pub. Date: May 16, 2013

(65) Prior Publication Data
US 2014/0257554 A1    Sep. 11, 2014

(30) Foreign Application Priority Data
Nov. 7, 2011 (JP) ................. 2011-243561

(51) Int. Cl.
*G06F 7/00* (2006.01)
*B65G 25/04* (2006.01)
(Continued)

(52) U.S. Cl.
CPC ............... *B65G 25/04* (2013.01); *H02K 11/21* (2016.01); *H02K 41/031* (2013.01); *H02P 25/06* (2013.01)

(58) Field of Classification Search
USPC .......................................... 700/229
See application file for complete search history.

(56) References Cited

U.S. PATENT DOCUMENTS

| 4,675,582 A | 6/1987 | Hommes et al. |
| 4,853,602 A | 8/1989 | Hommes et al. |

(Continued)

FOREIGN PATENT DOCUMENTS

| CN | 101185236 A | 5/2008 |
| CN | 101978594 A | 2/2011 |

(Continued)

OTHER PUBLICATIONS

The extended European search report issued by the European Patent Office on May 19, 2015, which corresponds to European Patent Application No. 12848407.8-1707 and is related to U.S. Appl. No. 14/353,465.

(Continued)

*Primary Examiner* — Kyle Logan
(74) *Attorney, Agent, or Firm* — Studebaker & Barckett PC

(57) ABSTRACT

A linear conveyor is provided with a linear motor stator including electromagnets and operable to individually undergo electric current supply control with respect to each zone; a conveyor carriage provided with a linear motor rotor and a unique information storing device; motor control devices configured to perform electric current supply control for the electromagnets with respect to each zone; and a reading device configured to read position correction data of the conveyor carriage stored in the unique information storing device. Each of the motor control devices is configured to correct a target stop position of the conveyor carriage, with use of the position correction data read by the reading device for performing electric current supply control based on the corrected target stop position.

17 Claims, 13 Drawing Sheets

(51) Int. Cl.
*H02P 25/06* (2016.01)
*H02K 41/03* (2006.01)

(56) References Cited

U.S. PATENT DOCUMENTS

| | | | |
|---|---|---|---|
| 5,984,498 A | 11/1999 | Lem et al. | |
| 6,191,507 B1 * | 2/2001 | Peltier | B65G 54/02 310/12.02 |
| 6,876,107 B2 * | 4/2005 | Jacobs | B60L 15/38 310/12.19 |
| 7,108,189 B2 * | 9/2006 | Kilibarda | B23Q 7/1442 235/475 |
| 2004/0262401 A1 | 12/2004 | Kilibarda | |
| 2006/0001390 A1 * | 1/2006 | Yamazaki | H02K 11/22 318/135 |
| 2011/0043159 A1 | 2/2011 | Shoda et al. | |
| 2011/0100252 A1 | 5/2011 | Fukukawa | |
| 2011/0109252 A1 | 5/2011 | Takagi | |
| 2011/0125307 A1 * | 5/2011 | Dickson | B23P 21/004 700/112 |

FOREIGN PATENT DOCUMENTS

| | | |
|---|---|---|
| JP | 2003-244929 A | 8/2003 |
| JP | 2004-250180 A | 9/2004 |
| JP | 2009-187239 A | 8/2009 |
| JP | 2010-130740 A | 6/2010 |
| JP | 2011-098786 A | 5/2011 |
| JP | 2011-101552 A | 5/2011 |
| TW | I314482 B | 9/2009 |

OTHER PUBLICATIONS

International Search Report; PCT/JP2012/006461; Dec. 25, 2012.

* cited by examiner

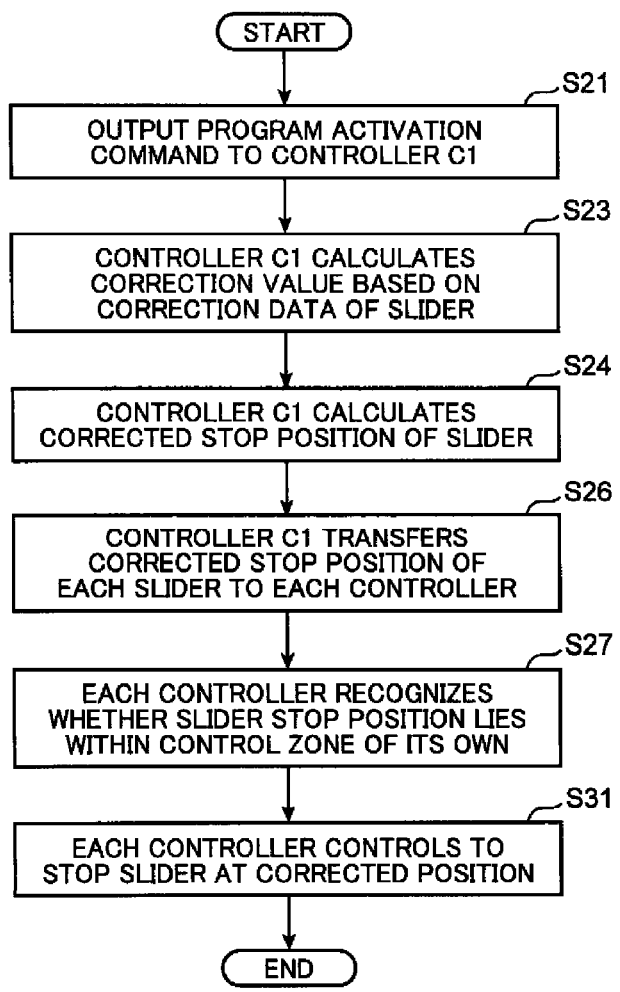

LINEAR CONVEYOR

CROSS REFERENCE TO RELATED APPLICATIONS

This application claims benefit of priority to Japanese Patent Application No. 2011-243561 filed on Nov. 7, 2011, and to International Patent Application No. PCT/JP2012/006461 filed on Oct. 9, 2012, the entire content of each of which is incorporated herein by reference.

TECHNICAL FIELD

The present technical field relates to a linear conveyor incorporated with a linear motor as a driving source.

BACKGROUND

Conventionally, there is known a linear conveyor configured to move a conveyor carriage (slider) along a rail on a base block, with use of a linear motor as a driving source (see e.g. JP 2011-98786A). In the linear conveyor, the conveyor path length may be extended depending on the purpose of use, or the conveyor carriage may be required to be dismounted, as necessary. In view of the above, it is often the case that a movable magnetic linear motor is employed as the linear motor. The movable magnetic linear motor has a linear motor stator constituted of electromagnets (field magnets) which are fixedly disposed on a base block in the form of an array, and a linear motor rotor constituted of a permanent magnet which is fixedly mounted on a conveyor carriage. The movable magnetic linear motor is configured to exert a force for impelling the conveyor carriage by controlling electric current supply to a coil constituting an electromagnet. The movable magnetic linear motor is provided with a linear scale constituted of a scale which is fixedly mounted on a conveyor carriage, and a number of sensors disposed on the base block side. It is possible to move the conveyor carriage to a specific position by controlling electric current supply to the electromagnet, based on a position of the conveyor carriage detected by the linear scale.

In the linear conveyor, the configuration (linear configuration or annular configuration) of a required conveyor path or a required conveyor path length may differ among the users. Further, the configuration of the conveyor path or the conveyor path length may be required to be changed afterwards. In order to meet with these demands in a simplified manner, there is proposed an idea of configuring a linear conveyor of unit members. Specifically, the following reasonable configuration is proposed. A unit member is constituted of the base block, a rail, electromagnets, and sensors of a linear scale. Then, a linear conveyor is configured by interconnecting a number of unit members to each other. A motor control device is disposed for each of the unit members. Then, electric current supply to the electromagnets in each of the unit members is individually controlled.

In the above configuration, the following matter should be taken into consideration. Each of the conveyor carriages has a movement error unique to each conveyor carriage due to a processing error or an assembling error. Accordingly, in order to position the conveyor carriages with high precision, it is necessary to know the unique movement errors in advance, and to correct the movement errors with respect to each of the conveyor carriages. In other words, in the case where a linear conveyor is constituted of a number of unit members, it is necessary to cause a motor control device of each of the unit members to store position correction data for use in correcting movement errors of the conveyor carriages, and to control electric current supply to the electromagnets, with use of the position correction data. Accordingly, in a linear conveyor including a large number of conveyor carriages, the operator is required to cause each of the motor control devices to store the position correction data for each of the conveyor carriages. This is cumbersome to the operator. Further, in the case where the configuration of a conveyor path or the conveyor path length is changed afterwards, or in the case where conveyor carriages are added afterwards, the operator is required to carefully manage whether position correction data is present in each of the motor control devices. If such a managing operation is not satisfactorily performed, it is difficult to secure positioning precision of conveyor carriages.

SUMMARY

In view of the above, an object of the disclosure is to provide a linear conveyor that enables to individually control a linear motor stator with respect to each zone of the linear motor stator, and to position a conveyor carriage with high precision, without accompanying management of position correction data in each of motor control devices.

A linear conveyor according to an aspect of the disclosure is provided with a linear motor stator including a plurality of electromagnets arranged along a predetermined conveyor path, and operable to individually undergo electric current supply control with respect to each of predetermined zones; a plurality of conveyor carriages each provided with a linear motor rotor and with a unique information storing device configured to store predetermined unique information, the linear motor rotor being constituted of a permanent magnet and constituting a linear motor in cooperation with the linear motor stator, the conveyor carriages being disposed to be movable along the conveyor path; a plurality of motor control devices provided in the respective corresponding zones of the linear motor stator, and configured to individually perform electric current supply control for the electromagnets with respect to each of the zones; and a reading device configured to read the unique information stored in the unique information storing device. The unique information storing device is configured to store, as the unique information, position correction data for use in correcting a movement error unique to the conveyor carriage. Each of the motor control devices is configured to determine, as control data, either the position correction data read by the reading device or process data processed with use of the position correction data for performing electric current supply control for the electromagnets with use of the control data so as to stop the conveyor carriage at a target stop position.

BRIEF DESCRIPTION OF THE DRAWINGS

FIG. 13 is a flowchart showing a control example of a slider in the linear conveyor.

DETAILED DESCRIPTION

In the following, a preferred embodiment of the disclosure is described referring to the accompanying drawings.

Figure 1:
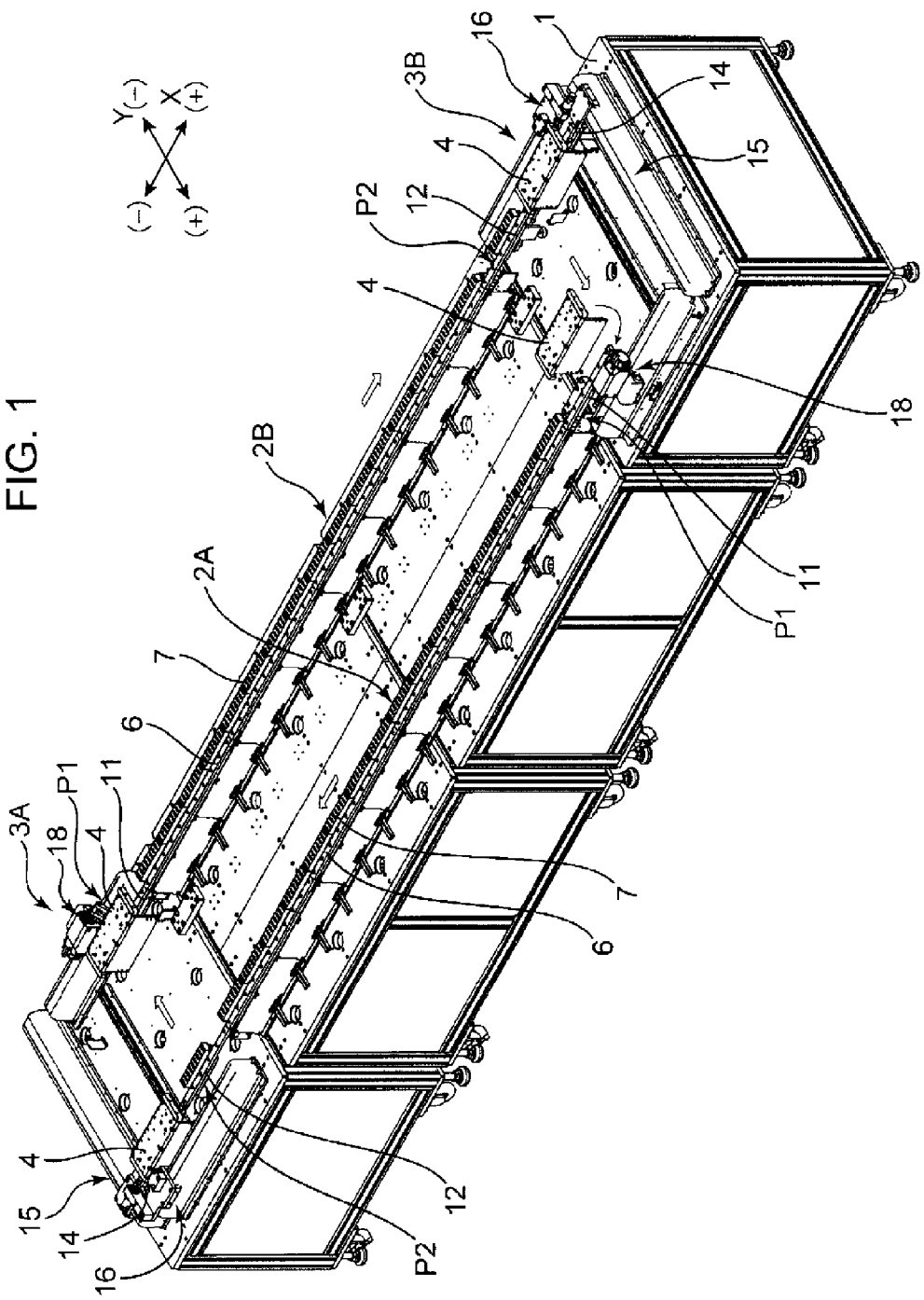
FIG. 1 is a perspective view showing the overall configuration of a linear conveyor according to the disclosure.

FIG. 1 is a perspective view showing the entire configuration of a linear conveyor according to the disclosure. Referring to FIG. 1, two directions (X direction and Y direction) orthogonal to each other on a horizontal plane are indicated as direction indexes.

As shown in FIG. 1, the linear conveyor is provided with a base block 1; a pair of linear conveying portions (a first linear conveying portion 2A and a second linear conveying portion 2B) formed on the base block 1 and extending in parallel to each other in a specific direction (X direction); direction inverting portions (a first direction inverting portion 3A and a second direction inverting portion 3B) formed on the base block 1 and disposed respectively on longitudinal ends of the linear conveying portions 2A and 2B; and a certain number of sliders 4 (corresponding to conveyor carriages of the disclosure) configured to be moved along each of the linear conveying portions 2A and 2B.

Each of the linear conveying portions 2A and 2B is configured to move the slider 4 in the X direction. Each of the linear conveying portions 2A and 2B is provided with a rail 6 extending in the X direction, and is configured to move the slider 4 along the rail 6. Each of the direction inverting portions 3A and 3B is configured to invert the moving direction of the slider 4 by parallel-moving the slider 4 from one of the end positions of each of the linear conveying portions 2A and 2B to the corresponding end position of the counterpart linear conveying portion. Specifically, in the linear conveyor, as shown by the hollow arrows in FIG. 1, each of the sliders 4 is moved from one end side (X direction (+) side) of the first linear conveying portion 2A toward the other end side (X direction (−) side) thereof, and then, is moved from the first linear conveying portion 2A to the second linear conveying portion 2B via the first direction inverting portion 3A. Then, each of the sliders 4 is moved from one end side (X direction (−) side) of the second linear conveying portion 2B toward the other end side (X direction (+) side) thereof, and then, is moved from the second linear conveying portion 2B to the first linear conveying portion 2A via the second direction inverting portion 3B. In this way, each of the sliders 4 is circulatingly moved.

Each of the direction inverting portions 3A and 3B has the following configuration. In this section, the configuration of the first direction inverting portion 3A is described.

The first direction inverting portion 3A includes a receiving portion P2, a feeding portion P1, a slide mechanism 15, a feed-in mechanism 16, and a feed-out mechanism 18. The receiving portion P2 has a rail 12 continuing to the rail 6 of the upstream linear conveying portion (first linear conveying portion 2A), and is configured to receive a slider 4 from the first linear conveying portion 2A. The feeding portion P1 has a rail 11 continuing to the rail 6 of the downstream linear conveying portion (second linear conveying portion 2B), and is configured to feed the slider 4 toward the second linear conveying portion 2B. The slide mechanism 15 is provided with a support portion 14 for supporting a slider 4 thereon. The slide mechanism 15 is configured to slide a slider 4 supported on the support portion 14 in Y direction between a position (shown in FIG. 1) corresponding to the receiving portion P2 and a position corresponding to the feeding portion P1, together with the support portion 14. The feed-in mechanism 16 is configured to feed a slider 4 received in the receiving portion P2 onto the support portion 14 of the slide mechanism 15. The feed-out mechanism 18 is configured to feed the slider 4 supported on the support portion 14 out of the support portion 14 into the feeding portion P1, and to push the slider 4 onto the second linear conveying portion 2B.

The support portion 14 is provided with an unillustrated rail. The unillustrated rail of the support portion 14 engages with the rail 12 in the receiving portion P2 in the Y direction when the support portion 14 is located in the receiving portion P2. Accordingly, by moving the slider 4 by the feed-in mechanism 16, the slider 4 is moved from the rail 12 in the receiving portion P2 onto the rail of the support portion 14, whereby the slider 4 is fed onto the support portion 14. On the other hand, when the support portion 14 is moved to the feeding portion P1, the unillustrated rail of the support portion 14 engages with the rail 11 in the feeding portion P1 in the Y direction. Accordingly, by moving the slider 4 by the feed-out mechanism 18, the slider 4 is carried from the unillustrated rail of the support portion 14 onto the rail 11 in the feeding portion P1, whereby the slider 4 is fed out of the support portion 14 into the feeding portion P1.

In other words, the slider 4 that has reached the end position of the first linear conveying portion 2A is received from the end position into the receiving portion P2 of the first direction inverting portion 3A, and then, is fed onto the support portion 14 of the slide mechanism 15 from the receiving portion P2 by the feed-in mechanism 16. Thereafter, the slider 4 is parallel-moved to the position corresponding to the feeding portion P1 together with the support portion 14 by actuating the slide mechanism 15. Then, after having been fed out of the support portion 14 into the feeding portion P1 by actuating the feed-out mechanism 18, the slider 4 is pushed onto the second linear conveying portion 2B. In this way, the first direction inverting portion 3A is configured to invert the moving direction of each of the sliders 4 by transferring the slider 4 from the first linear conveying portion 2A to the second linear conveying portion 2B.

The configuration of the first direction inverting portion 3A has been described as above. The second direction inverting portion 3B has substantially the same configuration as the first direction inverting portion 3A except for a point that a slider 4 is received from the second linear conveying portion 2B into the receiving portion P2, and a point that the slider 4 is fed out of the feeding portion P1 to the first linear conveying portion 2A.

Each of the sliders 4 is driven along each of the linear conveying portions 2A and 2B, with use of a linear motor as a driving source. The linear motor is constituted of a linear motor stator 7 provided in each of the linear conveying portions 2A and 2B, and a linear motor rotor 8 provided in each of the sliders 4 to be described later. In the following, an example of the configurations of the linear conveying portions 2A and 2B and the slider 4 including the above features is described referring to FIGS. 2 to 5. Since the basic configurations of the linear conveying portions 2A and 2B are substantially the same as each other, in this section, the configuration of the first linear conveying portion 2A is described.

Figure 2:
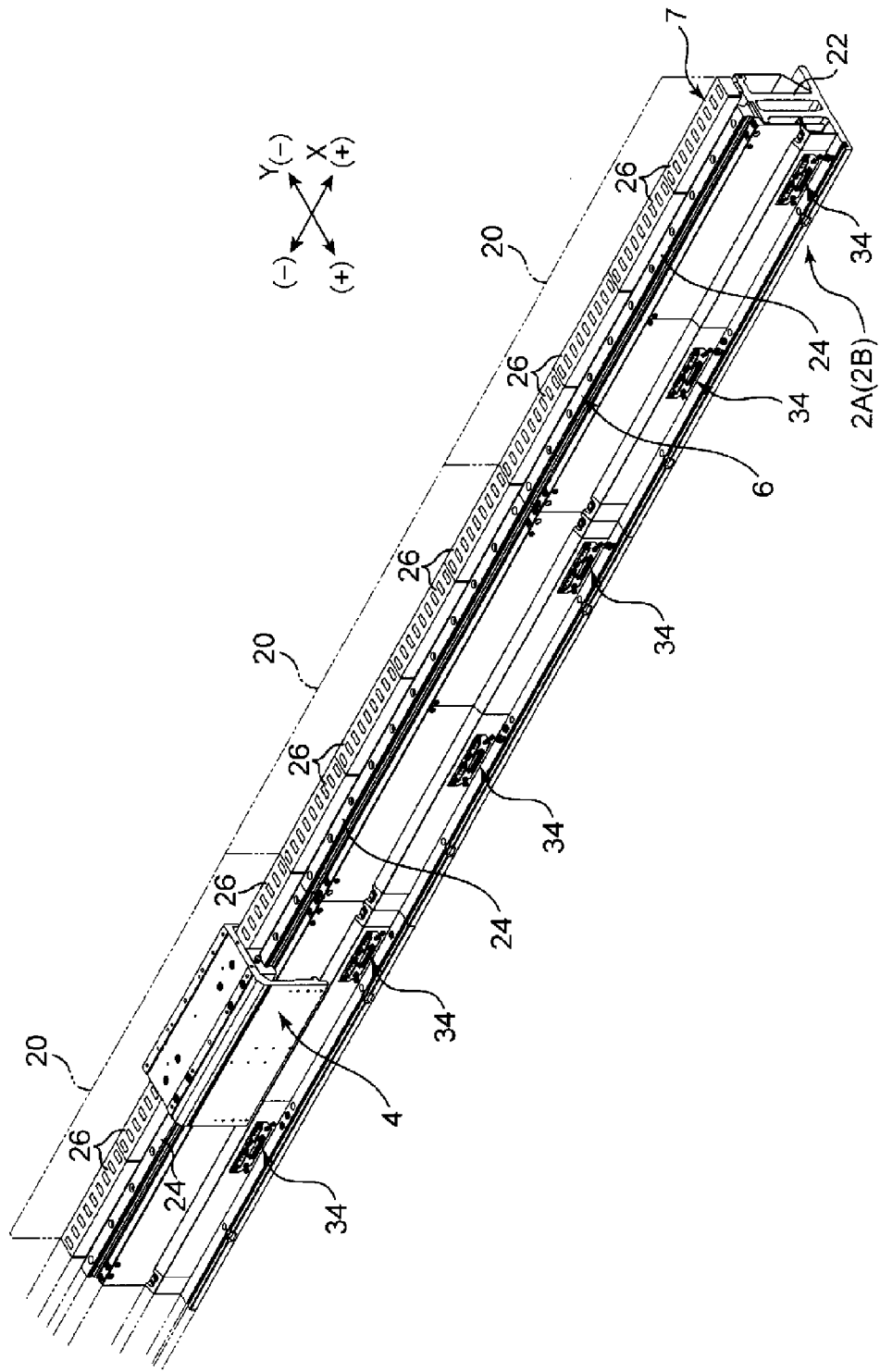
FIG. 2 is a perspective view showing a conveyor path (linear conveying portion) of the linear conveyor.

As shown in FIG. 2, the first linear conveying portion 2A is constructed by interconnecting a certain number of unit members 20 to each other in the X direction. In this example, the first linear conveying portion 2A is constructed by interconnecting four unit members 20 to each other.

Figure 3:
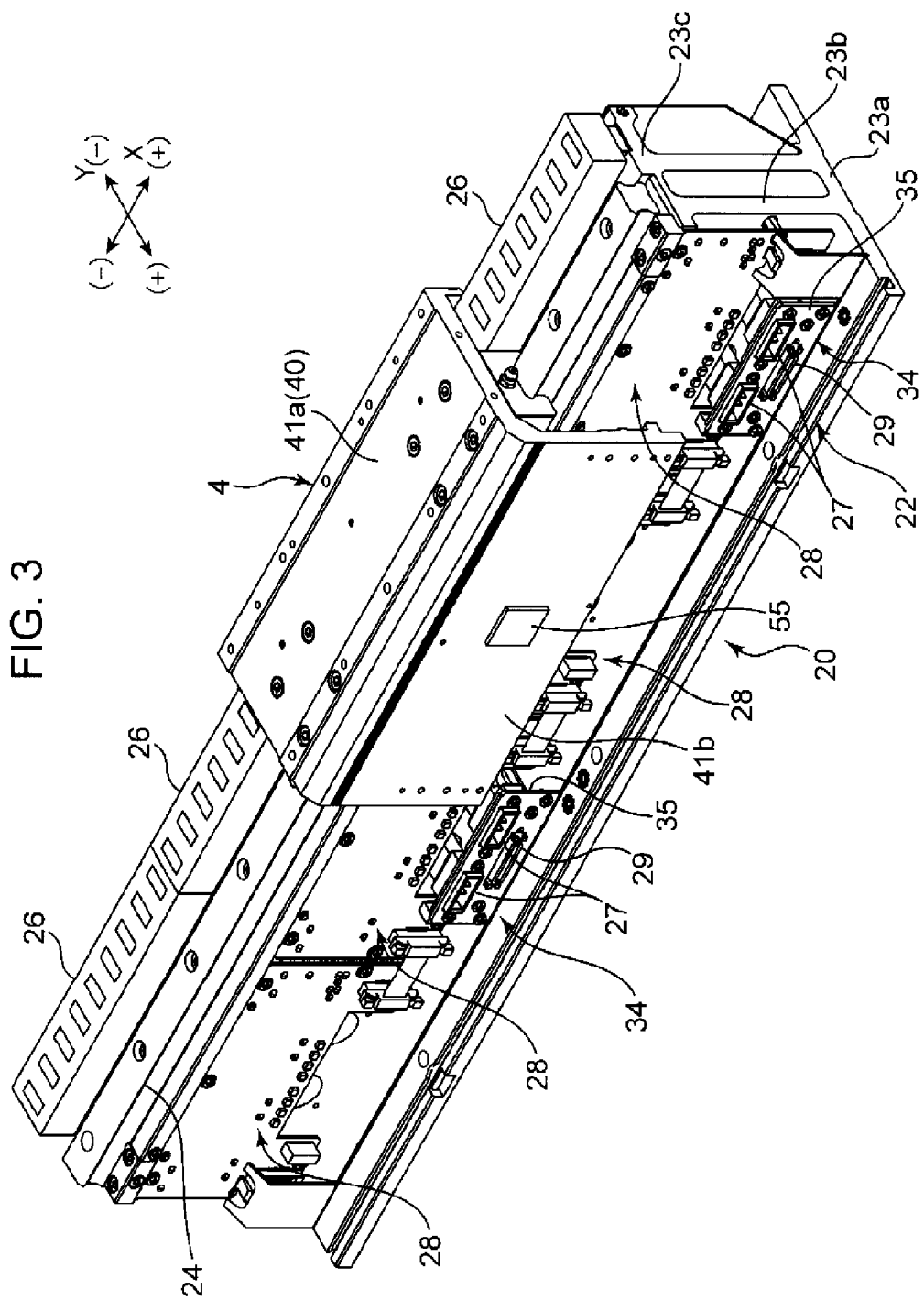
FIG. 3 is a perspective view showing unit members constituting the linear conveyor.
Figure 4:
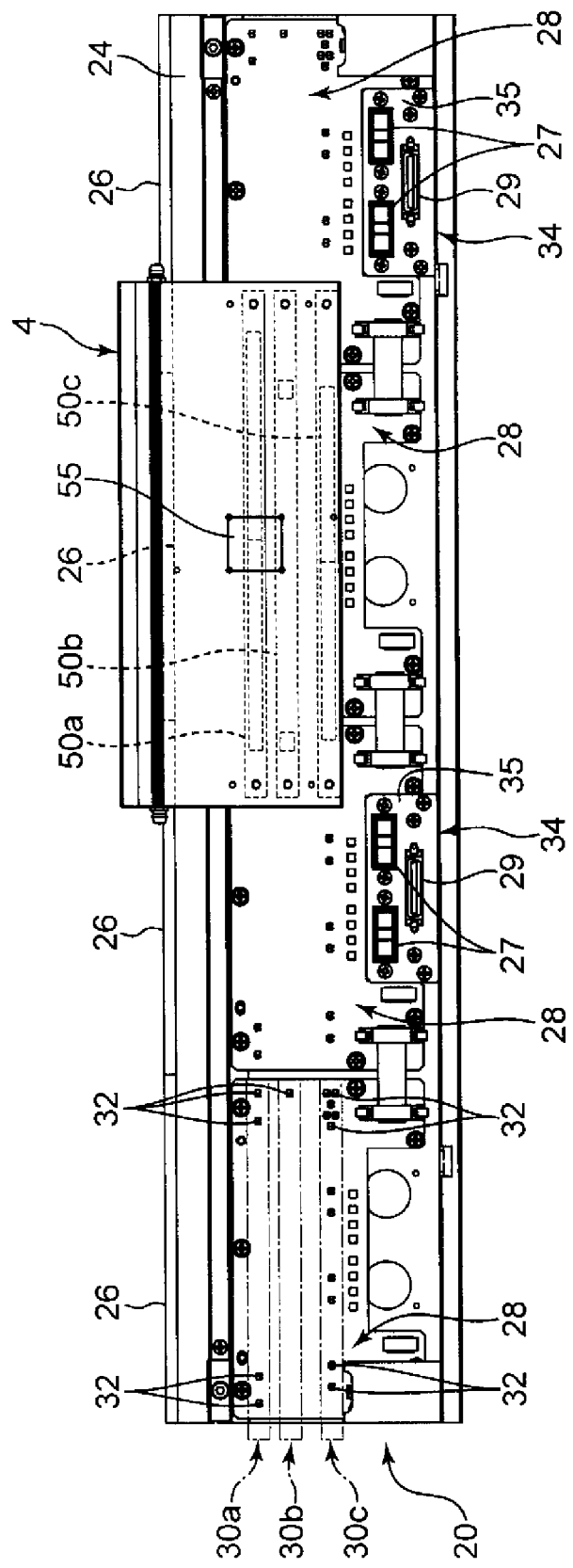
FIG. 4 is a front view showing unit members.
Figure 5:
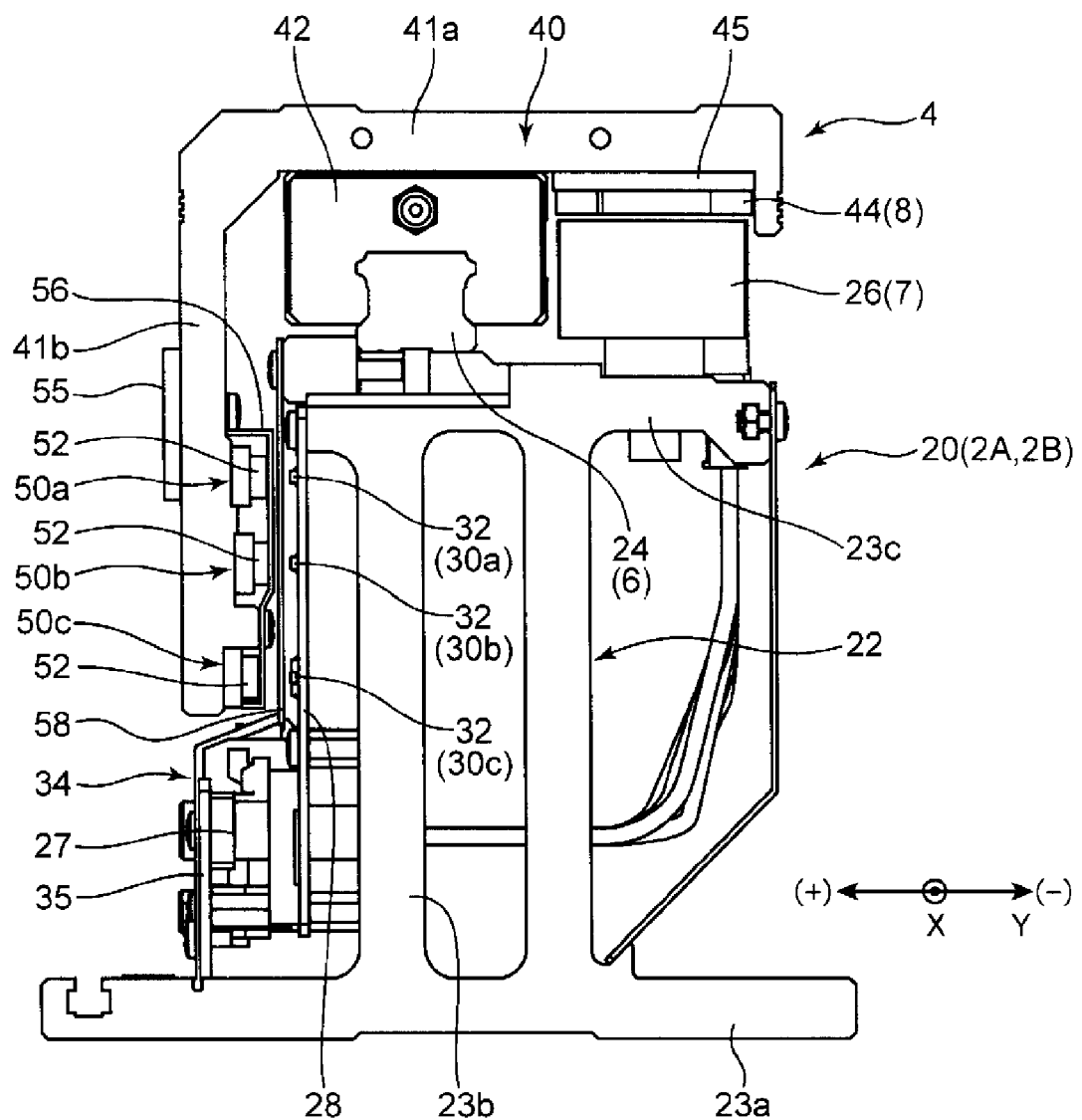
FIG. 5 is a side view showing a unit member and a slider.

As shown in FIGS. 3 to 5, each of the unit members 20 includes an elongated frame 22 extending in the X direction, a unit rail 24 fixedly mounted on the frame 22, electromagnet units 26, and sensor substrates 28.

The frame 22 is provided with a rectangular bottom plate portion 23a extending in the X direction, a rectangular upper plate portion 23c disposed above the bottom plate portion 23a and extending in the X direction, and a connection portion 23b vertically extending between the bottom plate portion 23a and the upper plate portion 23c and configured to connect between the bottom plate portion 23a and the upper plate portion 23c in the length direction of the bottom plate portion 23a and the upper plate portion 23c. The bottom plate portion 23a, the connection portion 23b, and the upper plate portion 23c are integrally made of an aluminum alloy. The unit rail 24 is fixedly mounted on the upper surface of the upper plate portion 23c of the frame 22 in such a direction as to extend in the same direction as the length direction of the upper plate portion 23c. Further, a certain number of the electromagnet units 26 are fixedly mounted on the upper surface of the upper plate portion 23c on the rear side (Y direction (−) side) of the unit rail 24 in the form of an array (in series) along the unit rail 24. In this example, four electromagnet units 26 having the same structure as each other are fixedly mounted. The electromagnet units 26 constitute the linear motor stator 7. Each of the electromagnet units 26 includes a certain number of electromagnets disposed in the form of an array in the X direction.

A certain number of the sensor substrates 28 are fixedly mounted on the connection portion 23b of the frame 22. In this example, four sensor substrates 28 are fixedly mounted, as with the case of the electromagnet units 26. Specifically, the sensor substrates 28 are fixedly mounted on the connection portion 23b in an upright posture along the side wall of the connection portion 23b in the form of an array (in series) along the unit rail 24.

The sensor substrates 28 constitute a linear scale in cooperation with magnet scales 50a to 50c, to be described later, which are fixedly mounted on each of the sliders 4. Each of the sensor substrates 28 is disposed on the front side (Y direction (+) side) of each of the electromagnet units 26 in such a manner as to detect the magnet scales 50a to 50c in a zone in which each of the electromagnet units 26 is disposed. Specifically, the unit member 20 is configured such that one zone obtained by equally dividing a region corresponding to the unit member 20 into four in the length direction (X direction) serves as one control zone by the linear motor, and one electromagnet unit 26 having substantially the same length as the length of each zone is fixedly mounted on the frame 22. As will be described later, a motor controller C is provided with respect to each zone. Electric current supply to the electromagnet units 26 with respect to each zone is individually controlled by the motor controllers C, based on detection of the presence of the magnet scales 50a to 50c by the corresponding sensor substrate 28. In this example, the total length (total length in the X-direction) of the unit member 20 is set to 640 mm. Accordingly, the total length of one control zone (one electromagnet unit 26) is set to 160 mm.

As shown in FIG. 4, the sensor substrate 28 has three sensor regions 30a to 30c vertically disposed away from each other (from the upper side, called the first sensor region 30a, the second sensor region 30b, and the third sensor region 30c).

Each of the sensor regions 30a to 30c is provided with one or more sensors 32 each constituted of a Hall element or an MR element. The sensors 32 in the sensor regions 30a to 30c are capable of detecting the magnet scales 50a to 50c, respectively. The sensors 32 in each of the sensor regions 30a to 30c are fixedly mounted with a certain disposition in the X direction.

The disposition and the number of the sensors 32 in each of the sensor regions 30a to 30c are the same as each other between the sensor substrates 28. Each of the sensors 32 is configured to detect the magnet scales 50a to 50c to be described later for outputting a waveform signal indicating an output voltage (amplitude) in accordance with a detected magnetic flux density of each of the magnet scales 50a to 50c.

The unit member 20 is provided with wiring connection portions 34 for the electromagnet units 26 and for the sensor substrates 28 on the front side (Y direction (+) side) of the sensor substrate 28.

The wiring connection portion 34 includes a fixing plate 35 which stands upright on the bottom plate portion 23a of the frame 22; and wiring connectors 27 for the electromagnet units 26 and a wiring connector 29 for the sensor substrate 28 which are respectively held on the fixing plate 35 with a forward orientation to be connectable with a counterpart connector. In this example, the wiring connection portion 34 is provided on the forward side of the first-located sensor substrate 28 and of the third-located sensor substrate 28 from the right end (right end in FIG. 4). Two wiring connectors 27 for two electromagnet units 26 adjacent to each other are held on the fixing plate 35 of one wiring connection portion 34 common to the two electromagnets 26. In this example, a common wiring connector 29 is provided as a wiring connector for two sensor substrates 28 adjacent to each other, and the wiring connector 29 is held on the fixing plate 35 of each of the wiring connection portions 34.

The first linear conveying portion 2A is configured such that the thus-constructed four unit members 20 are disposed (interconnected to each other) in series in the length direction, and that the bottom plate portion 23a of each of the frames 22 is fixedly mounted on the base block 1 by a fixing device such as a bolt. Interconnecting the four unit members 20 to each other as described above makes it possible to configure the rail 6, in which the unit rails 24 of the unit members 20 are interconnected to each other in series in the X direction, and also makes it possible to configure the linear motor stator 7 in which the electromagnet units 26 are interconnected to each other in series in the X direction.

The configuration of the first linear conveying portion 2A has been described as above. The second linear conveying portion 2B has substantially the same configuration as the first linear conveying portion 2A.

As shown in FIG. 5, the slider 4 includes a frame 40, a guide block 42 fixedly mounted on the frame 40, the linear motor rotor 8 (permanent magnets 44), the magnet scales 50a to 50c, and an RF (Radio Frequency) tag 55.

The frame 40 serves as a base member for the slider 4, and has an elongated shape in the X direction. Specifically, the frame 40 has an inverted L shape in section, and is constituted of a rectangular plate-shaped horizontal portion 41a disposed above the rails 6 of the linear conveying portions 2A and 2B, and a rectangular plate-shaped vertical portion 41b extending downward at a right angle from the widthwise front side (Y direction (+) side) of the horizontal portion 41a and facing the sensor substrate 28. The horizontal portion 41a and the vertical portion 41b are integrally made of an aluminum alloy.

A certain number of screw holes with which a table or a machine tool is fixedly engageable are formed in the upper surface of the horizontal portion 41a with a predetermined pattern. The guide block 42 is fixedly mounted on the lower surface of the horizontal portion 41a. The guide block 42 is mounted on the rail 6. In this way, the slider 4 is movably supported on the rail 6. The guide block 42 and the rail 6 (unit rail 24) are constituted by a linear guide, for instance.

The linear motor rotor 8 is fixedly mounted on the lower surface of the horizontal portion 41a on the rear side (Y direction (−) side) of the guide block 42, specifically, at a position facing the linear motor stator 7 of the linear conveying portion 2A, 2B (electromagnet unit 26 in the unit member 20). The linear motor rotor 8 includes a plate-shaped yoke 45 which is fixedly mounted on the lower surface of the horizontal portion 41a, and the plate-shaped permanent magnets 44 which are fixedly mounted on the lower surface of the yoke 45 in the form of an array in the X direction (moving direction of the slider 4). The permanent magnets 44 are disposed in such a manner that N pole and S pole alternately appear on the lower surfaces thereof. In other words, configuring the permanent magnets 44 in such a manner that electric current of one of u-phase, v-phase, and w-phase different from each other is supplied to the coil of each electromagnet of the linear motor stator 7 (electromagnet unit 26) by the motor controller C to be described later makes it possible to generate a force for impelling the frame 40 by interaction between the magnetic flux generated in the electromagnet and the magnetic flux of the permanent magnets 44, whereby the slider 4 is moved along the rail 6 by the impellent force.

The magnet scales 50a to 50c are fixedly mounted on the inner surface (right surface in FIG. 5) of the vertical portion 41b of the frame 40 in such a manner as to face the sensor substrate 28.

The magnet scales 50a to 50c are vertically disposed away from each other (from the upper side, called the first magnet scale 50a, the second magnet scale 50b, and the third magnet scale 50c). The first magnet scale 50a faces the first sensor region 30a, the second magnet scale 50b faces the second sensor region 30b, and the third magnet scale 50c faces the third sensor region 30c.

The detailed illustration of the magnet scales 50a to 50c is omitted. However, each of the magnet scales 50a to 50c is configured such that permanent magnets 52 are disposed in the form of an array in the X direction within a specific scale length, and that the N pole and the S pole alternately appear on the sensor substrate 28 side.

The number and the disposition of the permanent magnets 52 in each of the magnet scales 50a to 50c, and of the sensors 32 in each of the sensor regions 30a to 30c are determined, and a printed circuit on the sensor substrate 28 is configured in such a manner that a predetermined signal is output from the sensor substrate 28 to the motor controller C to be described later by causing the sensors 32 in each of the sensor regions 30a to 30c to detect the corresponding magnet scales 50a to 50c during the movement of the slider 4.

Specifically, the number and the disposition of the permanent magnets 52 in each of the magnet scales 50a to 50c, and of the sensors 32 in each of the sensor regions 30a to 30c are determined, and a printed circuit on the sensor substrate 28 is configured in such a manner that: the sensor substrate 28 outputs a sine-wave signal of an A-phase and a sine wave signal of a B-phase whose amplitude and period are the same as those of the sine-wave signal of the A-phase but whose phase is displaced from the A-phase by 90°, upon detecting the first magnet scale 50a by the sensor 32 in the first sensor region 30a; the sensor substrate 28 outputs a signal of a Z-phase, upon detecting the second magnet scale 50b by the sensor 32 in the second sensor region 30b; and the sensor substrate 28 outputs waveform signals whose periods are longer than those of the waveform signals of the A-phase and of the B-phase, and whose phases are displaced from each other and whose amplitudes are the same as each other, upon detecting the third magnet scale 50c by the sensor 32 in the third sensor region 30c.

Referring to FIG. 5, the reference sign 56 denotes a scale cover to be fixedly mounted on the vertical portion 41b of the frame 40. The scale cover 56 is configured to cover the magnet scales 50a to 50c for protecting the magnet scales 50a to 50c. Further, the reference sign 58 denotes a sensor cover 58 to be fixedly mounted on the frame 22 of the unit member 20. The sensor cover 58 is configured to cover the sensor substrate 28 for protecting the sensor substrate 28. The scale cover 56 and the sensor cover 58 are each made of an aluminum alloy. In FIG. 3 and FIG. 4, the linear conveyor is shown in a state that the scale cover 56 and the sensor cover 58 are omitted.

Figure 6:
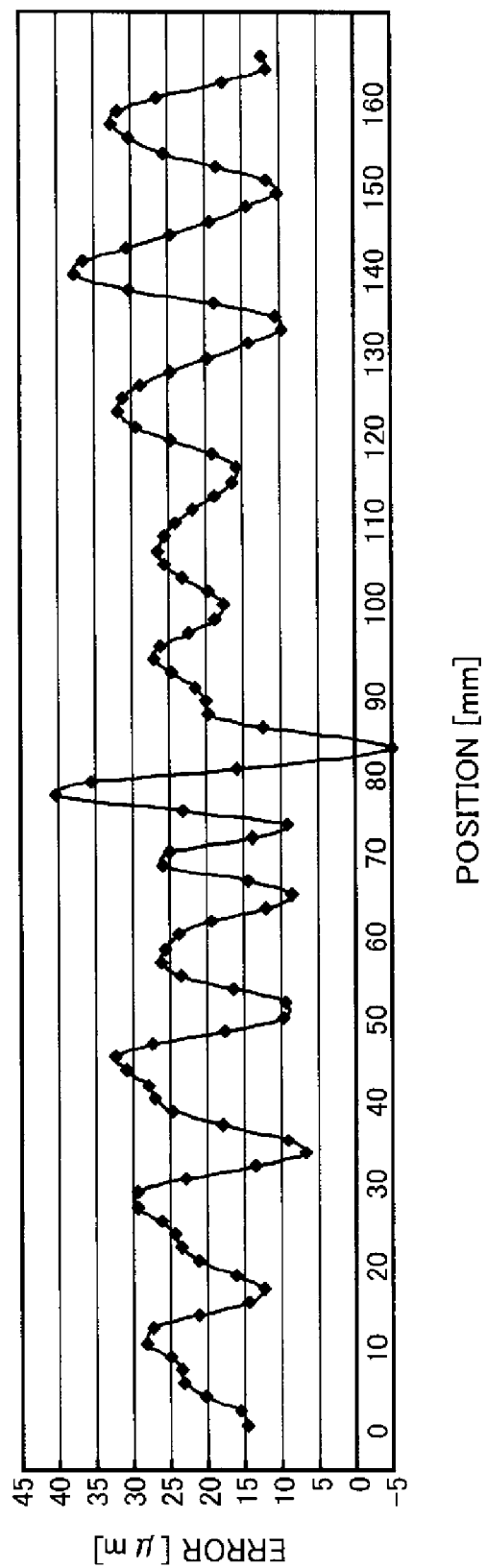
FIG. 6 is a diagram (graph) showing an example of position correction data.

The RF tag 55 is fixedly mounted on the outer surface (left surface in FIG. 5) of the vertical portion 41b of the frame 40, and at an intermediate position in a length direction (X direction) and in a vertical direction of the vertical portion 41b. The RF tag 55 is configured to store unique information on the slider 4 therein. Specifically, the RF tag 55 is configured to store ID information (identification data) of the slider 4, and position correction data for use in correcting a movement error unique to the slider 4. In this example, movement error data as shown in FIG. 6 is stored as the position correction data. The movement error data is obtained by using a jig provided with a master unit having a configuration substantially the same as the unit member 20, and a reference scale; and by calculating an error between the position of the slider 4, which is obtained from an output of the sensor substrate 28 when the slider 4 has been moved on the master unit member from a start point of the master unit member, and the position of the slider 4 on the reference scale, i.e., the absolute position of the slider 4, with respect to each control zone (160 mm).

The linear conveyor has a reader/writer 60 (see FIG. 7) which is configured to read or write the unique information recorded in the RF tag 55 of each of the sliders 4 in a non-contact manner. The reader/writer 60 is disposed near a conveyance start point of the linear conveyor. In this example, the upstream end of the first linear conveying portion 2A serves as the conveyance start point. The reader/writer 60 is disposed on a lateral portion of the feeding portion P1 (feeding portion P1 in the second direction inverting portion 3B) from which the slider 4 is fed to the conveyance start point. In this example, the RF tag 55 corresponds to a unique information storing device of the disclosure, and the reader/writer 60 corresponds to a reading device of the disclosure. Further, as shown in FIG. 1, the linear conveyor is configured such that an operator is allowed to insert a slider 4 into the conveyor path at the position corresponding to the conveyance start point by mounting the slider 4 on the rail 11 disposed in the feeding portion P1 of the second direction inverting portion 3B. In this example, the feeding portion P1 (rail 11) and the feed-out mechanism 18 correspond to an insertion mechanism of the disclosure.

In the configuration in which the reader/writer 60 is disposed on a lateral portion of the feeding portion P1 in the second linear conveying portion 2B, it is possible to read each data stored in an RF tag 55 in a state that a slider 4 is stopped. Thus, the above configuration is advantageous in enhancing the reading precision of the data.

In the linear conveyor, the operator is also allowed to insert a slider 4 into the conveyor path by mounting the slider 4 on the rail 11 disposed in the feeding portion P1 of the first direction inverting portion 3A. In this sense, the feeding portion P1 (rail 11) and the feed-out mechanism 18 of the first direction inverting portion 3A also corresponds to an insertion mechanism of the disclosure. Thus, disposing the reader/writer 60 on a lateral portion of the feeding portion P1 of the first direction inverting portion 3A makes it possible to read each data stored in an RF tag 55 in a state that a slider 4 is stopped. Thus, the above configuration is also advantageous in enhancing the reading precision of the data.

In the following, a control system of the linear conveyor is described.

Figure 7:
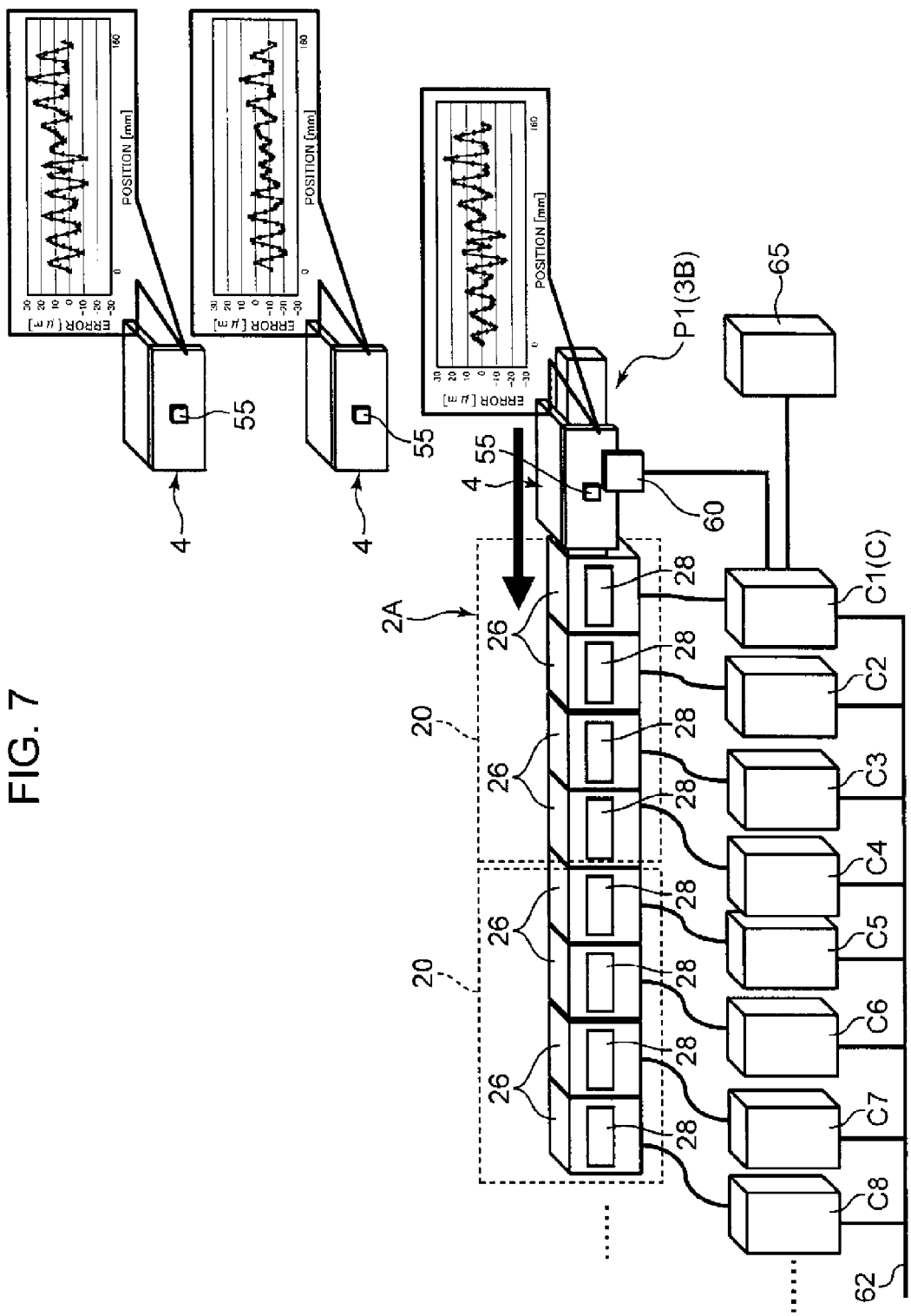
FIG. 7 is a wiring diagram showing a control system of the linear conveyor.

FIG. 7 is a wiring diagram showing a control system of the linear conveyor. As shown in FIG. 7, the linear conveyor is provided with motor controllers C (C1, C2, . . . ; corresponding to motor control devices of the disclosure) configured to control the linear motor of the linear conveying portions 2A and 2B. In the linear conveyor, as described above, one electromagnet 26 is independently disposed with respect to each control zone of the unit member 20, and electric current supply to the electromagnet unit 26 is controlled by the motor controller C with respect to each control zone. Accordingly, the linear conveyor including four unit members 20 in each of the linear conveying portions 2A and 2B is provided with thirty-two motor controllers C in total. Each of the motor controllers C is connected to an LAN (Local Area Network) 62 (corresponding to a network device of the disclosure), whereby the motor controllers C are communicatively connected to each other for data transmission. Further, the reader/writer 60 is connected to the motor controller C which controls electric current supply to each of the electromagnets of the electromagnet unit 26 in the control zone located on the most upstream side with respect to the conveyance start point of the linear conveyor (with respect to the upstream end of the first linear conveying portion 2A), in other words, each of the electromagnets of the electromagnet unit 26 located on the most upstream side in the unit member 20 on the most upstream side (right end in FIG. 7) constituting the first linear conveying portion 2A.

In the following description, in the case where it is necessary to discriminate the motor controllers C one from another with respect to each control zone, the motor controllers C are called as the first controller C1, the second controller C2, the third controller C3, . . . , and the thirty-second controller C32 in the order from the motor controller located on the most upstream side.

The linear conveyor is further provided with a PLC (Programmable Logic Controller) 65 for activating the operation of the linear conveyor. The PLC 65 is connected to the first controller C1, and outputs a signal to the first controller C1 for activating an internal program of the first controller C1. As will be described later, the first controller C1 is configured to activate the internal program upon receipt of the signal, and to transfer, to each of the controllers C2 to C32, information relating to a stop position (target stop position) and a moving speed of a slider 4 incorporated in the program. Each of the controllers C1 to C32 controls stopping and moving of the slider 4 concurrently with each other. A controller for each of the direction inverting portions 3A and 3B is provided independently of the motor controllers C. Driving of the slide mechanisms 15, the feed-in mechanisms 16, and the feed-out mechanisms 18 is controlled independently by the controllers.

Figure 8:
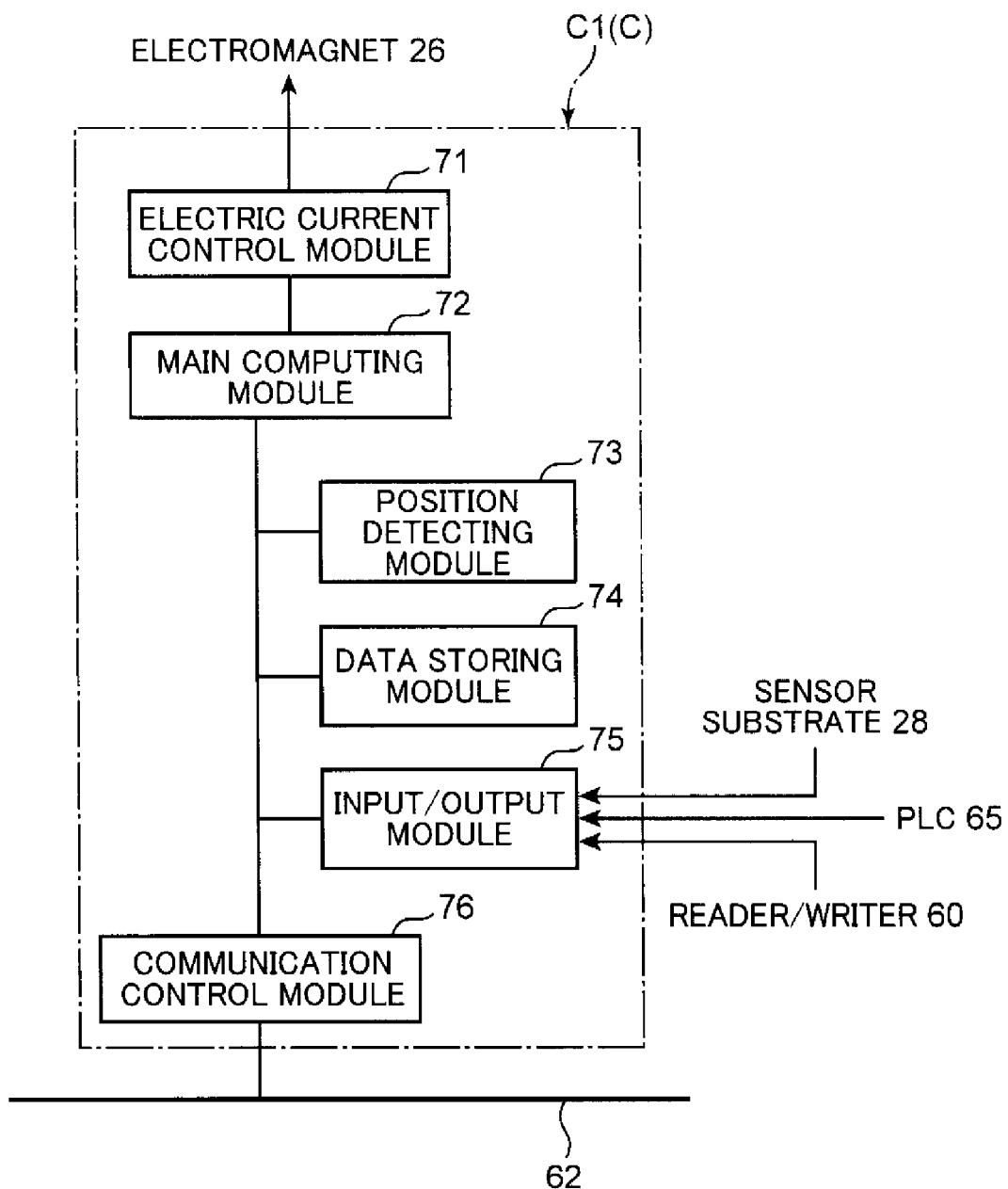
FIG. 8 is a block diagram showing a functional configuration of a motor controller.

FIG. 8 is a block diagram showing a functional configuration of the motor controller C (first controller C1). The first controller C1 is constituted of a circuit board on which a CPU and various memories are loaded. The first controller C1 functionally includes an electric current control module 71, a main computing module 72, a position detecting module 73, a data storing module 74, an input/output module 75, and a communication control module 76.

The main computing module 72 is configured to control the current control module 71 for electric current supply to each of the electromagnets of the electromagnet unit 26. The main computing module 72 executes a program stored in an unillustrated program storing module that is provided in the main computing module 72 upon receipt of a signal from the PLC 65, controls electric current supply to the electromagnet unit 26 based on the information relating to the stop position (target stop position) and the moving speed of a slider 4 incorporated in the program, and performs a computation processing necessary for the control.

The position detecting module 73 is configured to detect the position of a slider 4 based on a signal from the sensor substrate 28 to be input via the input/output module 75.

The data storing module 74 is configured to store unique information of each of the sliders 4 read by the reader/writer 60, and to store the order of disposition of the sliders 4 on the conveyor path. In the case where the target stop position of a slider 4 lies within the control zone to be controlled by the first controller C1, the main computing module 72 corrects the target stop position data based on the position correction data by referring to the position correction data of the slider 4 in the data storing module 74, and controls electric current supply to each of the electromagnets of the electromagnet unit 26 in accordance with the corrected target stop position data.

The communication control module 76 is configured to control data transmission between the first controller C1 and the other controllers C2 to C32. In this example, the main computing module 72 and the communication control module 76 of the first controller C1 correspond to a transmission control device of the disclosure.

In the foregoing section, the functional configuration of the first controller C1 among the motor controllers C has been described. The other controllers C2, C3, . . . also have substantially the same configuration as the controller C1 except for a point that information relating to the stop position (target stop position) and the moving speed of a slider 4 is incorporated in the internal program, and a point that a signal from the PLC 65 or unique information of the slider 4 read by the reader/writer 60 is directly input. In other words, regarding the other controllers C2 to C32, only the sensor substrate 28 is connected to the input/output module 75, whereas the PLC 65 and the reader/writer 60 are not connected to the input/output module 75. Accordingly, each piece of the information to be transferred from the first controller C1 is stored into the data storing module 74 from the communication control module 76. In this example, the data storing module 74 in each of the controllers C1 to C32 is configured to store the disposition order of the sliders 4 on the conveyor path. Accordingly, each of the data storing modules 74 has a function as a disposition order storing device of the disclosure.

In the following, control of the linear motor to be performed in the linear conveyor is described.

At first, a process of reading and distributing unique information of each of the sliders 4 is described. In the linear conveyor, as described above, the linear motor is controlled by the motor controllers C with respect to each control zone of the linear conveying portions 2A and 2B. Accordingly, it is necessary to prepare an environment, in which each of the motor controllers C can refer to the position correction data of each of the sliders 4 for precisely positioning the sliders 4. In view of the above, in the linear conveyor, each of the motor controllers C is configured to acquire the position correction data in accordance with the flowchart shown in FIG. 9.

Figure 9:
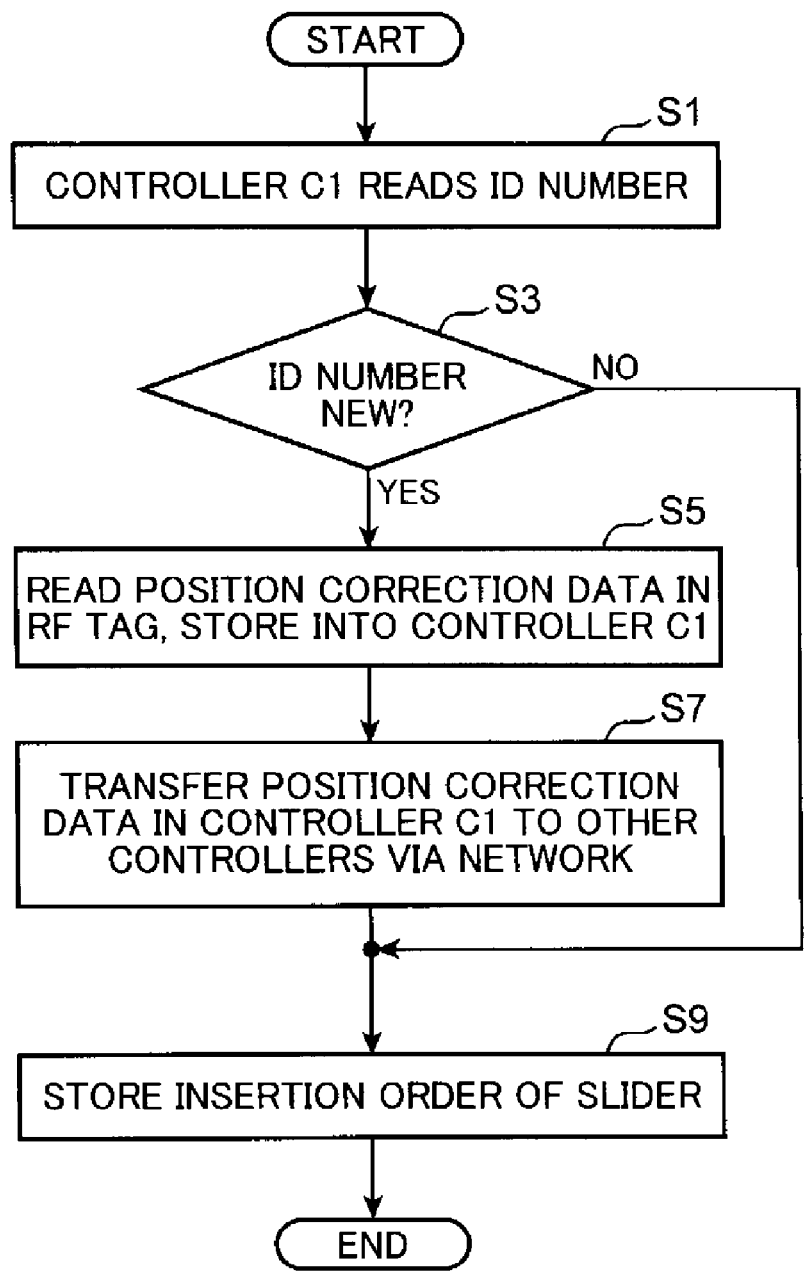
FIG. 9 is a flowchart showing an example of a process of reading and distributing unique information.

Referring to FIG. 9, when the slider 4 is disposed at the conveyance start point (feeding portion P1 of the second direction inverting portion 3B), the first controller C1 (main computing module 72) controls the reader/writer 60 to read the ID information stored in the RF tag 55 of the slider 4 (Step S1). Then, the first controller C1 determines whether the ID information is new, in other words, whether the position correction data of the slider 4 has already been acquired (Step S3). In the case where the determination result in Step S3 is YES, the first controller C1 controls the reader/writer 60 to read the position correction data of the slider 4, and causes the data storing module 74 to store the position correction data in association with the ID information (Step S5). Then, the first controller C1 transmits the position correction data together with the ID information to the other controllers C2 to C32 via the LAN 62 (Step S7). Thereafter, each of the controllers C1 to C32 causes the data storing module 74 to store the disposition order (insertion order) of the slider 4 therein (Step S9). In the case where the first controller C1 determines that the ID information is not new in the process of Step S3, the first controller C1 controls the reader/writer 60 to transmit only the ID information of the slider 4 to the other controllers C2 to C32. By the above operation, the first controller C1 and the other controllers C2 to C32 update the data relating to the disposition order (insertion order) of the slider 4.

In the linear conveyor, at the initial setting, sliders 4 are sequentially inserted into the conveyor path from the feeding portion P1 of the second direction inverting portion 3B (see FIG. 1 and FIG. 7). Accordingly, by performing the processes of Steps S1 to S9, each of the motor controllers C acquires the disposition order of the sliders 4 to be circulatingly moved on the linear conveyor, and the position correction data of each of the sliders 4. The processes of Steps S1 to S9 are continuously executed after the linear conveyor has started to operate. Accordingly, even in the case where another slider 4 is additionally inserted into the conveyor path, each of the motor controllers C acquires the position correction data of the newly added slider 4, and acquires latest data on the disposition order.

Figure 10:
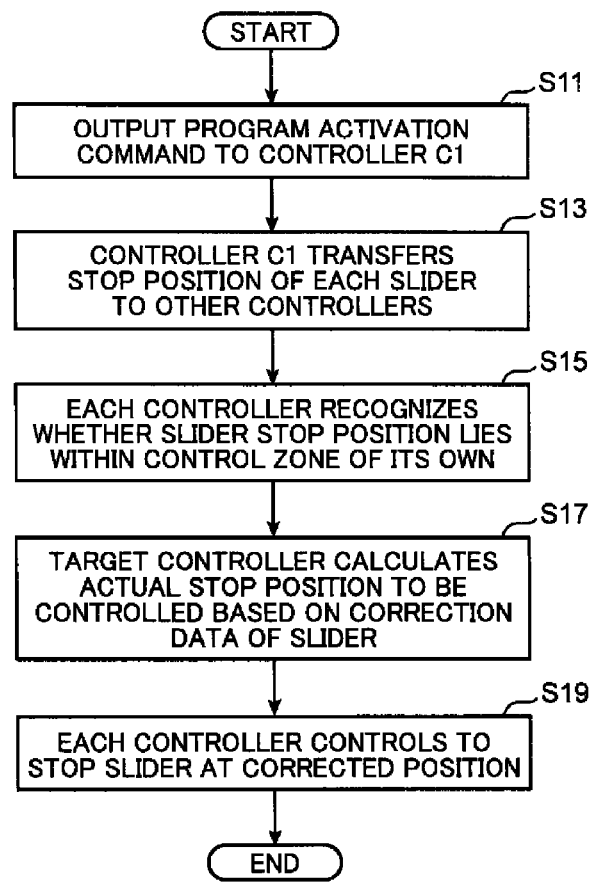
FIG. 10 is a flowchart showing a control example of a slider in the linear conveyor.

Next, a control operation of the linear motor to be performed by each of the motor controllers C is described according to the flowchart shown in FIG. 10.

At first, upon receipt of a signal from the PLC 65, the program of the first controller C1 is activated, whereby the target stop position of the slider 4 is determined by the first controller C1 (Step S11). Then, the first controller C1 transmits data on the target stop position to the other controllers C2 to C32 via the LAN 62 (Step S13).

Each of the motor controllers C (main computing module 72) recognizes whether the target stop position lies within the control zone of its own, based on the target stop position data and known design data i.e. the total length (640 mm) of the unit member 20 and the length (160 mm) of one control zone (Step S15).

The motor controller C, which has recognized that the target stop position lies within the control zone of its own, specifies the slider 4 which should be stopped at the target stop position based on the data stored in the data storing module 74, and corrects the target stop position by referring to the position correction data (see FIG. 6) of the slider 4 (Step 17). In performing the above operation, each of the motor controllers C (main computing module 72) specifies the slider 4 to be controlled (slider 4 that should be stopped at the target stop position: hereinafter, called as a target slider), by referring to the disposition status of the slider 4 on the conveyor path via the LAN 62, and based on the result of reference, the identification data read by the reader/writer 60 (identification data read in Step S1 in FIG. 9), and the disposition order data stored in the data storing module 74.

After the target stop position has been corrected, the motor controller C which has recognized that the target stop position of the slider 4 lies within the control zone of its own controls electric current supply to each of the electromagnets of the electromagnet unit 26, based on the corrected target stop position (Step S 19).

Figure 11:
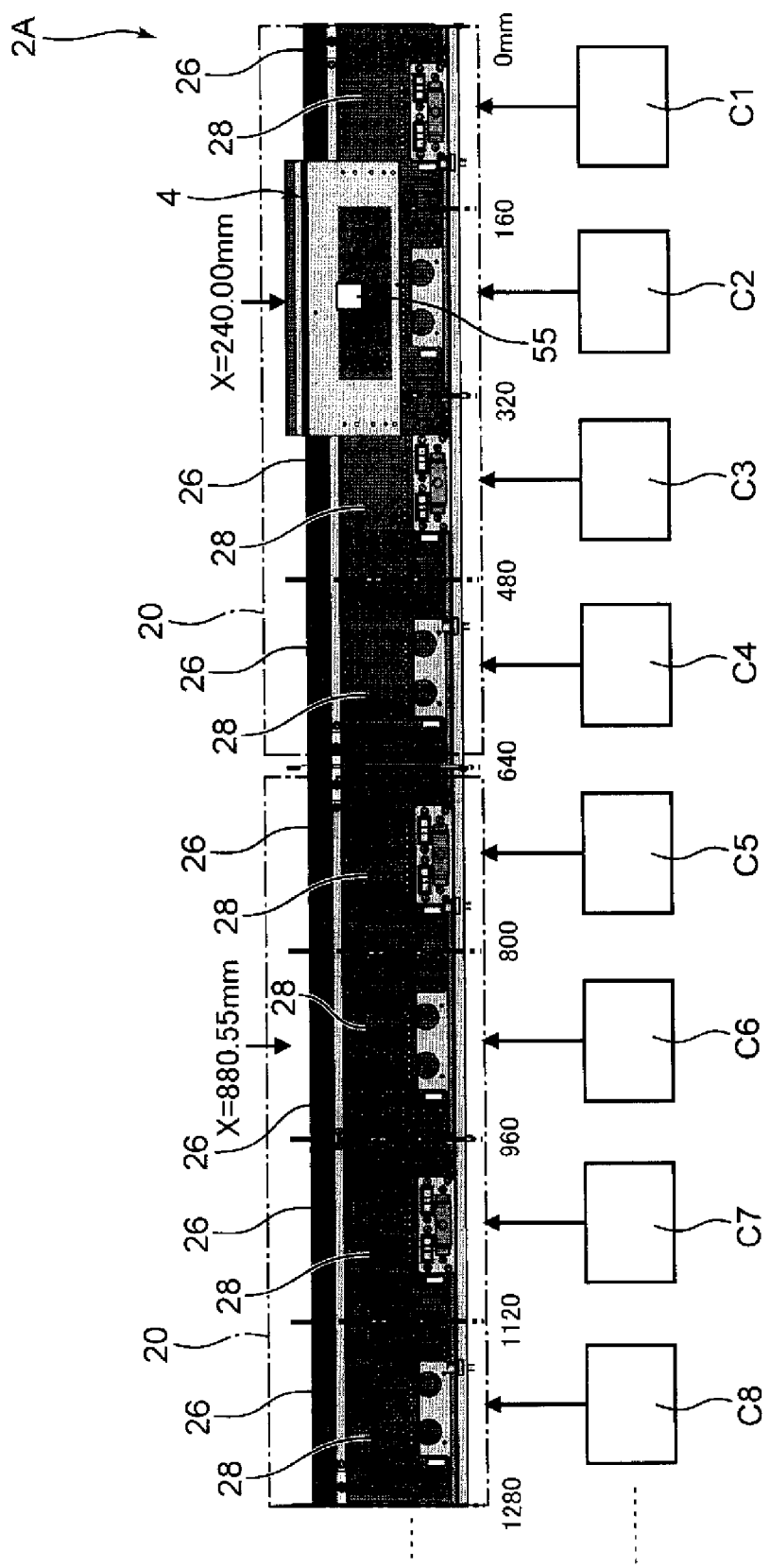
FIG. 11 is a schematic front view of the linear conveyor for describing a control example of a slider.

An example of the control operations in Step S11 to Step S19 as described above is described as follows. For instance, as shown in FIG. 11, let it be assumed that a target stop position (X=880.55 mm) is determined with respect to the slider 4 that is stopped at a point X=240 mm away from the conveyance start point. In this case, the target stop position lies within the second control zone from the upstream side in the second-located unit member 20 with respect to the conveyance start point. Accordingly, the sixth controller C6 corresponding to the control zone recognizes that the target stop position lies within the control zone of its own (processes of Step S11 to S15).

The sixth controller C6 specifies with which position in the control zone, the target stop position coincides. Specifically, the sixth controller C6 obtains a target stop position (80.55 mm) within the control zone of its own by dividing the distance (X=880.55 mm) from the conveyance start point to the target stop position, with the distance (160 mm) corresponding to one control zone. Then, the target stop position is corrected by adding an error (e.g. −0.02 mm) of the target stop position of the position correction data of the target slider 4 to the target stop position (namely, 80.53 mm=80.55+(−0.02)) (process of Step S17).

By the above operation, the sixth controller C6 controls electric current supply to each of the electromagnets of the electromagnet unit 26 based on the corrected target stop position (80.53 mm) (process of Step S19).

In the thus-configured linear conveyor, the linear conveying portions 2A and 2B are configured by interconnecting the unit members 20 to each other. Further, the linear motor is driven and controlled by the individual motor controllers C with respect to each control zone. Accordingly, the degree of freedom on the conveyor path length is high. In the thus-configured linear conveyor, it is possible to optionally set the conveyor path length according to the purpose of use, and to easily cope with a change in the conveyor path length afterwards.

Further, in the linear conveyor, each of the sliders 4 is loaded with the RF tag 55 in which position correction data for use in correcting a unique movement error is stored, and the position correction data is read by the reader/writer 60, and is transmitted and stored in each of the motor controllers C. At the time of driving the sliders 4, each of the motor controllers C controls driving of each of the sliders 4, after the target stop position is corrected with use of the position correction data corresponding to each of the sliders 4. In other words, each of the motor controllers C controls electric current supply to each of the electromagnets of the electromagnet unit 26. Accordingly, even in a configuration, in which a servo motor is controlled with use of plural motor controllers C, it is possible to position each of the sliders 4 with high precision, while taking into consideration a movement error unique to each of the sliders 4. In particular, in the linear conveyor, as described above, the RF tag 55 is loaded on each of the sliders 4, the position correction data is read by the reader/writer 60 at the time of inserting each of the sliders 4 into the conveyor path, and the position correction data is transmitted to each of the motor controllers C. Accordingly, there is no need for the operator to perform a cumbersome operation of causing each of the motor controllers C to store position correction data. Further, even in the case where a slider 4 is additionally inserted afterwards, the position correction data of the newly added slider 4 is automatically read merely by allowing the operator to insert the slider 4 into the conveyor path from the feeding portion P1 of the second direction inverting portion 3B, and is transmitted and stored in each of the motor controllers C. Accordingly, it is possible to promptly use the newly added slider 4, without the need of data input operation by the operator.

In this example, each of the motor controllers C (main computing module 72) is configured to specify a target slider 4, based on the disposition order data stored in the data storing module 74 of its own. Alternatively, for instance, the disposition order data may be stored only in the data storing module 74 of the first controller C1, and in the process of Step S13, the disposition order and the ID information of the target slider 4 may be transferred to the other controllers C2 to C32 via the LAN 76 together with the target stop position data. In the modification, the data storing module 74 of the first controller C1 functions as a disposition order storing device of the disclosure.

Modified Control of Linear Motor

In the thus-configured linear conveyor, each of the motor controllers C is configured to store the position correction data and the disposition order data of each of the sliders 4. Alternatively, only the first controller C1 may be configured to store the position correction data and the disposition order data of each of the sliders 4. In the following, a control operation of the linear motor to be performed by each of the motor controllers C in the modification is described according to the flowchart shown in FIG. 12. In the above control, the process of Step S7 in the flowchart shown in FIG. 9 is basically omitted.

At first, the program of the first controller C1 is activated upon receipt of a signal from the PLC 65, and a target stop position is determined (Step S21). Then, the first controller C1 calculates a correction value of the target stop position, by referring to the position correction data of the target slider 4 based on the data stored in the data storing module 74 (Step S23). Thereafter, each of the data on the target stop position and the correction value is transmitted to the other controllers C2 to C32 via the LAN 62 (Step S25).

Each of the motor controllers C (main computing module 72) recognizes whether the target stop position lies within the control zone of its own based on the target stop position data (Step S27). The motor controller C, which has recognized that the target stop position lies within the control zone of its own, corrects the target stop position based on the correction value data (Step S29).

By the above operation, the motor controller C, which has recognized that the target stop position lies within the control zone of its own, controls electric current supply to each of the electromagnets of the electromagnet unit 26 based on the corrected target stop position (Step S31).

An example of the control operation of Steps S21 to S31 as described above is described by the example shown in FIG. 11 as follows.

At first, the first controller C1 specifies with which position in the control zone, the target stop position coincides. Specifically, the first controller C1 obtains a target stop position (80.55 mm) within the control zone of its own by dividing the distance (X=880.55 mm) from the conveyance start point to the target stop position, with the distance (160 mm) corresponding to one control zone. Then, the first controller C1 obtains an error of the target stop position, in other words, a correction value (for instance, −0.02 mm) by referring to the position correction data of the target slider 4, and transmits each of the data on the target stop position (X=880.55 mm) and the correction value (−0.02 mm) to each of the controllers C2 to C32 (processes of Steps S21 to S25). In performing the above operation, the first controller C1 (main computing module 72) specifies the target slider 4 by referring to the disposition status of the target slider 4 on the conveyor path via the LAN 62, and based on the result of reference, the identification data read by the reader/writer 60 (identification data read in Step S1 in FIG. 9), and the disposition order data stored in the data storing module 74.

Then, each of the motor controllers C determines whether the target stop position lies within the control zone of its own (process of Step S27). In this example, the target stop position (X=880.55 mm) lies within the second control zone from the upstream side in the second-located unit member 20 with respect to the conveyance start point. Accordingly, the sixth controller C6 corresponding to the control zone recognizes that the target stop position lies within the control zone of its own. Further, the sixth controller C6 obtains a target stop position (80.55 mm) within the control zone of its own, based on the target stop position data (X=880.55 mm), and corrects the target stop position by the correction value data (−0.02 mm) (namely, 80.53 mm=80.55+(−0.02)) (process of Step S29).

By the above operation, the sixth controller C6 controls electric current supply to each of the electromagnets of the electromagnet unit 26 based on the corrected target stop position (80.53 mm) (process of Step S31).

Figure 12:
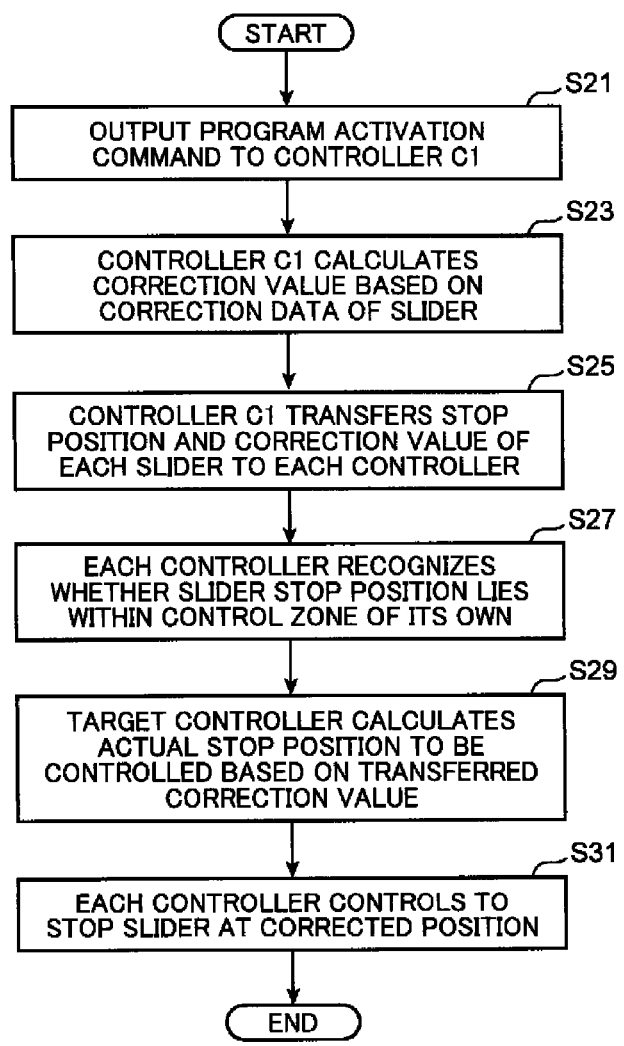
FIG. 12 is a flowchart showing a control example of a slider in the linear conveyor.

According to the control shown in FIG. 12, as compared with a configuration, in which each of the motor controllers C is configured to store the position correction data on all the sliders 4, it is possible to suppress the storage capacity of the data storing module 74 in each of the controllers C2 to C32 other than the first controller C1, and to suppress the amount of data to be transmitted via the LAN 62.

As a further modification of the control shown in FIG. 12, a servo motor may be controlled according to the flowchart shown in FIG. 13. The flowchart shown in FIG. 13 is different from the flowchart shown in FIG. 12 in the points that Step S24 and Step S26 are added, in place of Step S25 shown in FIG. 12, and that Step S29 shown in FIG. 12 is omitted. Specifically, in the flowchart shown in FIG. 13, after the first controller C1 obtains a correction value in Step S23, the first controller C1 corrects the target stop position based on the correction value (Step S24). Then, the first controller C1 transmits the corrected target stop position data to the other controllers C2 to C32 via the LAN 62 (Step S26). Then, each of the motor controllers C recognizes whether the target stop position lies within the control zone of its own based on the corrected target stop position data (Step S27). Then, the motor controller C, which has recognized that the target stop position lies within the control zone of its own, controls electric current supply to each of the electromagnets of the electromagnet unit 26 based on the target stop position (Step S31).

Let us describe the example shown in FIG. 11 in detail. After obtaining an error of the target stop position, i.e., a correction value (for instance, −0.02 mm), the first controller C1 corrects the target stop position (X=880.55 mm) by the correction value (−0.02 mm) (namely, 880.53 mm=880.55+ (−0.02)) (processes of Steps S21 and S23).

Then, the first controller C1 transmits the corrected target stop position data (X'=880.53 mm) to the other controllers C2 to C32 (process of Step S26).

Each of the motor controllers C determines whether the corrected target stop position lies within the control zone of its own (process of Step S27). In this example, the target stop position (X'=880.53 mm) lies within the second control zone from the upstream side in the second-located unit member 20 with respect to the conveyance start point. Accordingly, the sixth controller C6 corresponding to the control zone recognizes that the target stop position lies within the control zone of its own.

By the above operation, the sixth controller C6 obtains a target stop position (80.53 mm) within the control zone from the target stop position data (X'=880.53 mm), and controls electric current supply to each of the electromagnets of the electromagnet unit 26 based on the target stop position (process of Step S31).

In the case of the control of the linear motor according to the flowchart shown in FIG. 13, it is also possible to obtain substantially the same effects as with the case of controlling the linear motor according to the flowchart shown in FIG. 12.

The linear conveyor as described above is one of the preferred embodiments of the linear conveyor of the disclosure. It is possible to modify the configuration of the linear conveyor as necessary, as far as such modification does not depart from the gist of the disclosure.

For instance, in the embodiment (see the flowchart shown in FIG. 9), each of the motor controllers C is configured to correct the target stop position with use of the position correction data of each of the sliders 4 by causing the reader/writer 60 disposed at the conveyance start point of the linear conveyor to read the position correction data of each of the sliders 4; and by causing each of the motor controllers C to store the position correction data. Alternatively, a reader/writer 60 may be disposed with respect to each control zone of the linear conveying portions 2A and 2B, and each of the motor controllers C may control the corresponding reader/writer 60 to directly read the position correction data of a target slider 4. In the above modification, as far as a target stop position and ID information of the slider 4 are obtained, each of the motor controllers C can directly specify the target slider 4 and correct the target stop position by reading the position correction data from the RF tag 55 of the target slider 4. Thus, the above modification makes it possible to provide substantially the same effects, as with the case of the linear conveyor of the embodiment. In the modification, however, a large number of reader/writers 60 are necessary. Accordingly, the configuration of reading the position correction data of each of the sliders 4 by a common reader/writer 60, as described in the embodiment, is more advantageous in view of the cost and maintenance service.

In the case where a reader/writer 60 is disposed with respect to each control zone as described above, it is not necessarily required to cause the RF tag 55 of each of the sliders 4 to store the ID information therein. For instance, in the case where the moving speed of a slider 4 is very low, the motor controller C corresponding to a control zone including a target stop position may directly read the position correction data from the RF tag 55 of the slider 4 that is approaching the control zone for correcting the target stop position based on the position correction data. This eliminates the need of identifying the slider 4 by each of the motor controllers C. The above modification makes it possible to omit ID information. Further, even in the case where information of the RF tags 55 is read by a common (single) reader/writer 60 as in the case of the embodiment (example shown in FIG. 10), as far as the number of sliders 4 is not changed afterwards, it is possible to omit ID information of the RF tags 55. For instance, as far as the position correction data is stored in association with the disposition order of the sliders 4, the motor controller C can specify the disposition order of a target slider 4 which should be stopped at the target stop position by referring to the disposition status of the sliders 4 on the conveyor path via the LAN 62. Thus, correcting the target stop position based on the position correction data corresponding to the disposition order makes it possible to control the sliders 4 without using the ID information.

Further, in the linear conveyor of the embodiment, information relating to the stop position (target stop position) and the moving speed of the target slider 4 is incorporated in the internal program of the first controller C1 located at a position closest to the conveyance start point, among the controllers C1 to C32. Activating the internal program of the first controller C1 upon receipt of a signal from the PLC 65 makes it possible to transfer the information relating to the stop position (target stop position) of the slider 4 and the moving speed of the slider 4 from the first controller C1 to each of the controllers C2 to C32, and to store the information into the internal program of each of the controllers C2 to C32. Further, the linear conveyor is configured such that connecting the reader/writer 60 to the first controller C1 to thereby transfer the unique information (ID information and position correction data) of each of the sliders 4 read by the reader/writer 60 from the first controller C1 to each of the controllers C2 to C32, and store the unique information into the internal program of each of the controllers C2 to C32, makes it possible for each of the controllers C1 to C32 to control electric current supply to the electromagnets of each of the electromagnet units 26, based on the internal programs. Alternatively, in the thus-configured linear conveyor, for instance, the first controller C1 or one of the other controllers C2 to C32 may integrally control all of the motor controllers C.

Further, the reader/writer 60 may not be necessarily disposed near the conveyance start point (feeding portion P1 of the second direction inverting portion 3B), unlike the embodiment. As far as the reader/writer 60 is disposed at a position capable of reading unique information recorded in the RF tag 55 of each of the sliders 4, the reader/writer 60 may be disposed at a position other than the conveyance start point.

Further, in the linear conveyor of the embodiment, the conveyor path is formed in such a manner that a slider 4 is circulatingly moved along a horizontal plane. Alternatively, the conveyor path may be formed in such a manner that a slider 4 is circulatingly moved along a vertical plane. In other words, the first linear conveying portion 2A and the second linear conveying portion 2B may be vertically disposed away from each other, and each of the direction inverting portions 3A and 3B may be configured to parallel-move a slider 4 vertically between the linear conveying portions 2A and 2B.

Further, in the linear conveyor of the embodiment, the direction inverting portions 3A and 3B are disposed respectively on longitudinal ends of the linear conveying portions 2A and 2B parallel to each other. Alternatively, for instance, the linear conveyor may be constituted of one linear conveying portion, and transport devices such as a belt conveyor which is configured to return a slider 4 that has reached an end position of the linear conveying portion to a start position thereof. The transport devices may be a rectilinear robot.

Further, in the linear conveyor of the embodiment, the RF tag 55 is used as a unique information storing device of the disclosure, and unique information stored in the RF tag 55 is read by the reader/writer 60. However, as far as it is possible to read unique information stored in the unique information storing device in a non-contact manner, the unique information storing device and the reading device of the disclosure may have any configuration other than the configuration of the embodiment.

Further, the linear conveyor of the embodiment is configured such that a slider 4 is circulatingly moved along an annular conveyor path. It is needless to say that the linear conveyor may be configured such that a slider 4 is rectilinearly moved along a linear conveyor path. Specifically, the linear conveyor may be configured such that sliders 4 disposed on a linear conveyor path are integrally moved back and forth in the same direction or individually moved back and forth within the respective allocated regions.

Further, in the linear conveyor of the embodiment, each of the unit members 40 constituting the linear conveying portions 2A and 2B includes four control zones (electromagnet units 26). Alternatively, the number of control zones may be smaller than four, or not smaller than five.

Further, in the linear conveyor of the embodiment, each of the linear conveying portions 2A and 2B is configured by interconnecting the unit members 20 to each other. Alternatively, for instance, the linear conveyor may be configured such that one continuous frame is provided over the entire length region of the linear conveying portion 2A (or 2B), and that an array of electromagnet units 26 and an array of sensor substrates 28 are fixedly mounted on the frame.

The following is a summary of the disclosure as described above.

A linear conveyor according to an aspect of the disclosure is provided with a linear motor stator including a plurality of electromagnets arranged along a predetermined conveyor path, and operable to individually undergo electric current supply control with respect to each of predetermined zones; a plurality of conveyor carriages each provided with a linear motor rotor and with a unique information storing device configured to store predetermined unique information, the linear motor rotor being constituted of a permanent magnet and constituting a linear motor in cooperation with the linear motor stator, the conveyor carriages being disposed to be movable along the conveyor path; a plurality of motor control devices provided in the respective corresponding zones of the linear motor stator, and configured to individually perform electric current supply control for the electromagnets with respect to each of the zones; and a reading device configured to read the unique information stored in the unique information storing device. The unique information storing device is configured to store, as the unique information, position correction data for use in correcting a movement error unique to the conveyor carriage. Each of the motor control devices is configured to determine, as control data, either the position correction data read by the reading device or process data processed with use of the position correction data for performing electric current supply control for the electromagnets with use of the control data so as to stop the conveyor carriage at a target stop position.

In the linear conveyor, the position correction data for use in correcting a movement error unique to a conveyor carriage is stored in each of the conveyor carriages (unique information storing device). The reading device is configured to read the position correction data to thereby cause each of the motor control devices to perform electric current supply control for the electromagnets within a corresponding zone thereof, with use of the position correction data (or the process data). Accordingly, it is possible to position the conveyor carriage with high precision, without accompanying a cumbersome operation by the operator of causing each of the motor control devices to store the position correction data of each of the conveyor carriages.

In the linear conveyor, the reading device may be provided for each of the motor control devices. The above configuration, however, requires a large number of reading devices in correspondence to the number of conveyor carriages, which results in a cost increase. In view of the above, preferably, the linear conveyor may be further provided with a network device configured to communicatively connect between the motor control devices for enabling information transmission, and a transmission control device configured to control the information transmission by the network devices. The reading device is disposed at a specific point on the conveyor path by the number smaller than the number of the motor control devices, and the transmission control device is configured to transmit the control data to each of the motor control devices. In the above configuration, for instance, setting one specific point makes it possible to further suppress the cost increase.

According to the above configuration, the position correction data of each of the conveyor carriages is read by the reading device disposed at the specific point, and transmitted to each of the motor control devices. Thus, it is possible to suppress a cost increase resulting from providing reading devices for each of the motor control devices.

As a specific configuration of the linear conveyor, preferably, the unique information storing device may be further configured to store identification data capable of identifying the conveyor carriage, as the unique information, the reading device may be configured to read the identification data in addition to the position correction data, the transmission control device may be configured to transmit the position correction data and the identification data read by the reading device to each of the motor control devices, and each of the motor control devices may be provided with a data storing device configured to store the identification data and the position correction data of each of the conveyor carriages in correlation to each other, and in stopping a conveyor carriage at the target stop position, each of the motor control devices may be configured to correct the target stop position based on a piece of position correction data of the target conveyor carriage to be controlled among the pieces of position correction data stored in the data storing device for performing electric current supply control for the electromagnets based on the corrected target stop position.

In the above configuration, the position correction data of all the conveyor carriages is stored in the data storing device in each of the motor control devices. Each of the motor control devices corrects the target stop position of the conveyor carriage, with use of the position correction data stored in the data storing device, and performs electric current supply control for the electromagnets based on the corrected target stop position.

Preferably, the linear conveyor may be further provided with a disposition order storing device configured to store the order of disposition of the conveyor carriages disposed on the conveyor path based on the order of the pieces of identification data read by the reading device, wherein each of the motor control devices is configured to specify the target conveyor carriage to be controlled by referring to a disposition status of the conveyor carriages on the conveyor path via the network device, and based on a result of the reference, the identification data read by the reading device, and the disposition order stored in the disposition order storing means.

According to the above configuration, each of the motor control devices can easily specify a conveyor carriage which should be stopped at the target stop position among the conveyor carriages to be moved along the conveyor path. In the above configuration, the data storing device may function as the transmission control device by causing the data storing means in each of the motor control devices, or the data storing device in a specific one of the motor control devices to store the disposition order of the conveyor carriages disposed along the conveyor path based on the order of the pieces of identification data read by the reading device.

Further, as another specific configuration of the linear conveyor, the transmission control device may include a data storing device configured to store identification data and the position correction data of each of the conveyor carriages in correlation to each other, and in stopping a conveyor carriage at the target stop position, the transmission control device may be configured to correct the target stop position, based on a piece of position correction data of the target conveyor carriage to be controlled among the pieces of position correction data stored in the data storing device for transmitting, to each of the motor control devices, data indicating the corrected target stop position, as the control data, and each of the motor control devices may be configured to perform electric current supply control for the electromagnets based on the corrected target stop position.

In the above configuration, the position correction data of all the conveyor carriages is stored in the data storing device of the transmission control device. Then, the target stop position of the conveyor carriage is corrected by the transmission control device, and each of the motor control devices performs electric current supply control for the electromagnets upon receipt of data on the corrected target stop position.

In the above configuration, preferably, the data storing device may be configured to further store the order of disposition of the conveyor carriages disposed on the conveyor path based on the order of the pieces of identification data read by the reading device, and the transmission control device may be configured to specify the target conveyor carriage to be controlled by referring to a disposition status of the conveyor carriages on the conveyor path via the network device, and based on a result of the reference, the identification data read by the reading device, and the disposition order stored in the data storing device.

According to the above configuration, the transmission control device can easily specify the conveyor carriage which should be stopped at the target stop position among the conveyor carriages to be moved along the conveyor path.

In the linear conveyor, the transmission control device may be provided independently of the motor control devices. However, preferably, one of the motor control devices for performing electric current supply control for a specific one of the plurality of the zones of the linear motor stator may serve as the transmission control device.

According to the above configuration, causing the motor control device to have the function of the transmission control device makes it possible to simplify the configuration of the linear conveyor, and to reduce the cost.

Further, the specific point at which the reading device is disposed may be plural points on the conveyor path, as far as the reading device is capable of reading unique information of each of the conveyor carriages. In the above configuration, preferably, the specific point may include a predetermined conveyance start point of the conveyor carriage, or a position near the conveyance start point. Further, in the case where the linear conveyor is further provided with an insertion mechanism configured to allow an operator to insert the conveyor carriage into the conveyor path at the conveyance start point or at the position near the conveyance start point, preferably, the reading device may be disposed at the position of the insertion mechanism. In the above configuration, the conveyance start point may be a point (position) common to all the conveyor carriages, or may be plural points individually set with respect to each group of conveyor carriages. In the case where the conveyance start point is plural points as described above, plural insertion mechanisms may be provided.

According to the above configurations, in starting to move a conveyor carriage from a predetermined conveyance start point, or in inserting a conveyor carriage into the conveyor path, the position correction data of the conveyor carriage is read. In particular, in a configuration in which the position correction data is read in inserting a conveyor carriage into the conveyor path by the insertion mechanism, the reading precision of position correction data is enhanced because the conveyor carriage is in a stopped state or in a low speed state.

Further, preferably, the linear conveyor may be further provided with a plurality of unit members each including a rail member for forming the conveyor path, and the electromagnets disposed along the rail member, the unit members being interconnected to each other in series in a length direction of the rail members, whereby the conveyor path is formed of the rail members, and the linear motor stator is formed of the electromagnets. Each of the motor control devices is configured to perform electric current supply control for the electromagnets included in the unit member with respect to each of the zones of the linear motor stator.

According to the above configuration, it is possible to flexibly cope with a change in the conveyor path length afterwards, while enhancing the degree of freedom on the conveyor path length of the linear conveyor.

Industrial Applicability

As described above, the linear conveyor of the disclosure is configured to position a conveyor carriage with high precision, while causing motor control devices to individually perform electric current supply control for each corresponding zone of a linear motor stator, without accompanying management of causing each of the motor control devices to store position correction data. Accordingly, the disclosure is useful for factory facilities in which a certain degree of freedom is required regarding the configuration (linear configuration or annular configuration) of a conveyor path of workpieces or regarding the conveyor path length, or for factory facilities, in which a change is required afterwards regarding the configuration of a conveyor path or regarding the conveyor path length.

The invention claimed is:

1. A linear conveyor, comprising:
   a linear motor stator including a plurality of electromagnets arranged along a predetermined conveyor path, and operable to individually undergo electric current supply control with respect to each of predetermined zones;
   a plurality of conveyor carriages each provided with a linear motor rotor and with a unique information storing device configured to store predetermined unique information, the linear motor rotor being constituted of a permanent magnet and constituting a linear motor in cooperation with the linear motor stator, the conveyor carriages being disposed to be movable along the conveyor path;
   a plurality of motor control devices provided in the respective corresponding zones of the linear motor stator, and configured to individually perform electric current supply control for the electromagnets with respect to each of the zones; and
   a reading device configured to read the unique information stored in the unique information storing device,
   the unique information storing device being configured to store, as the unique information, position correction data for use in correcting a movement error unique to the conveyor carriage, and
   each of the motor control devices being configured to determine, as control data, either the position correction data read by the reading device or process data processed with use of the position correction data for performing electric current supply control for the electromagnets with use of the control data so as to stop the conveyor carriage at a target stop position.

2. The linear conveyor according to claim 1, wherein
the reading device is disposed at each of the zones of the linear motor stator, and
each of the motor control devices is configured to perform electric current supply control for the electromagnets, with use of the position correction data read by the reading device in the corresponding zone.

3. The linear conveyor according to claim 1, further comprising:
a plurality of unit members each including a rail member for forming the conveyor path, and the electromagnets disposed along the rail member, the unit members being interconnected to each other in series in a length direction of the rail members, whereby the conveyor path is formed of the rail members, and the linear motor stator is formed of the electromagnets, wherein
each of the motor control devices is configured to perform electric current supply control for the electromagnets included in the unit member with respect to each of the zones of the linear motor stator.

4. The linear conveyor according to claim 3, wherein
the unit member includes the electromagnets for forming the zones consecutive to each other.

5. The linear conveyor according to claim 3, wherein
the position correction data is data obtained by calculating a movement error of the conveyor carriage in the zone on a predetermined reference scale with use of a jig having a configuration substantially the same as the unit member.

6. The linear conveyor according to claim 1, further comprising:
a network device configured to communicatively connect between the motor control devices for enabling information transmission; and
a transmission control device configured to control the information transmission by the network device, wherein
the reading device is disposed at a specific point on the conveyor path by a number smaller than a number of the motor control devices, and
the transmission control device is configured to transmit the control data to each of the motor control devices.

7. The linear conveyor according to claim 6, wherein
one of the motor control devices for performing electric current supply control for a specific one of the plurality of the zones of the linear motor stator serves as the transmission control device.

8. The linear conveyor according to claim 6, wherein
the transmission control device includes a data storing device configured to store identification data and the position correction data of each of the conveyor carriages in correlation to each other, and in stopping a conveyor carriage at the target stop position, the transmission control device is configured to correct the target stop position, based on a piece of position correction data of the target conveyor carriage to be controlled among pieces of the position correction data stored in the data storing device for transmitting, to each of the motor control devices, data indicating the corrected target stop position, as the control data, and
each of the motor control devices is configured to perform electric current supply control for the electromagnets based on the corrected target stop position.

9. The linear conveyor according to claim 8, wherein
the data storing device is configured to further store the order of disposition of the conveyor carriages disposed on the conveyor path based on an order of pieces of the identification data read by the reading device, and
the transmission control device is configured to specify the target conveyor carriage to be controlled by referring to a disposition status of the conveyor carriages on the conveyor path via the network device, and based on a result of a reference, the identification data read by the reading device, and the disposition order stored in the data storing device.

10. The linear conveyor according to claim 6, wherein
the specific point includes a predetermined conveyance start point of the conveyor carriage, or a position near the conveyance start point.

11. The linear conveyor according to claim 10, further comprising:
an insertion mechanism configured to allow an operator to insert a conveyor carriage into the conveyor path at the conveyance start point or at the position near the conveyance start point, wherein
the reading device is disposed at a position of the insertion mechanism.

12. The linear conveyor according to claim 10, wherein
the motor control device which performs electric current supply control for a specific one of the plurality of the zones of the linear motor stator serves as the transmission control device, the specific zone being a zone of the linear motor stator closest to the conveyance start point.

13. The linear conveyor according to claim 6, wherein
the unique information storing device is further configured to store identification data capable of identifying the conveyor carriage, as the unique information,
the reading device is configured to read the identification data in addition to the position correction data,
the transmission control device is configured to transmit the position correction data and the identification data read by the reading device to each of the motor control devices, and
each of the motor control devices is provided with a data storing device configured to store the identification data and the position correction data of each of the conveyor carriages in correlation to each other, and in stopping a conveyor carriage at the target stop position, each of the motor control devices is configured to correct the target stop position based on a piece of position correction data of the target conveyor carriage to be controlled among pieces of the position correction data stored in the data storing device for performing electric current supply control for the electromagnets based on the corrected target stop position.

14. The linear conveyor according to claim 13, wherein
distances of the zones of the linear motor stator are set to be substantially equal to each other, with a position corresponding to a distance from a predetermined conveyance start point serving as the target stop position, and
each of the motor control devices is configured to divide the distance from the conveyance start point to the target stop position by a distance of one zone, and to determine whether the target stop position lies within the zone of its own for electric current supply control based on the calculation result.

15. The linear conveyor according to claim 13, further comprising:
a disposition order storing device configured to store an order of disposition of the conveyor carriages disposed on the conveyor path based on an order of pieces of the identification data read by the reading device, wherein each of the motor control devices is configured to specify the target conveyor carriage to be controlled by referring to a disposition status of the conveyor carriages on the conveyor path via the network device, and based on a result of a reference, the identification data read by the reading device, and the disposition order stored in the disposition order storing device.

16. The linear conveyor according to claim 15, wherein the data storing device of each of the motor control devices serves as the disposition order storing device.

17. The linear conveyor according to claim 15, wherein the transmission control device is configured to transmit to each of the motor control devices data indicative of the disposition order stored in the disposition order storing device.

* * * * *